US012783935B2

(12) United States Patent
Patel et al.

(10) Patent No.: US 12,783,935 B2
(45) Date of Patent: Nov. 3, 2026

(54) MACHINE LEARNING MODEL SELECTION

(71) Applicant: INTERNATIONAL BUSINESS MACHINES CORPORATION, Armonk, NY (US)

(72) Inventors: Kushal S. Patel, Pune (IN); Benjie Asuncion Amaba, Collierville, TN (US); Gandhi Sivakumar, Bentleigh (AU); Sarvesh S. Patel, Pune (IN); Craig M. Trim, Ventura, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1220 days.

(21) Appl. No.: 17/491,859

(22) Filed: Oct. 1, 2021

(65) Prior Publication Data

US 2023/0107309 A1 Apr. 6, 2023

(51) Int. Cl.
*G06N 20/00* (2019.01)

(52) U.S. Cl.
CPC .................................... *G06N 20/00* (2019.01)

(58) Field of Classification Search
None
See application file for complete search history.

(56) References Cited

U.S. PATENT DOCUMENTS 6,021,113 A 2/2000 Doshi et al.
6,845,393 B1 1/2005 Murphy et al.
8,364,612 B2 * 1/2013 Van Gael ............... G06N 20/00 706/12
10,819,434 B1 10/2020 Rahman
10,944,689 B2 3/2021 Guim Bernat et al.
11,204,923 B2 * 12/2021 Sun ..................... G06F 16/2455
11,443,237 B1 * 9/2022 Song ..................... G06F 16/338
2016/0275139 A1 * 9/2016 Gandhe ............... G06F 16/3323

(Continued)

FOREIGN PATENT DOCUMENTS

WO WO2014113367 A1 7/2014
WO WO2015103514 A1 7/2015
WO WO2021074701 A1 4/2021

OTHER PUBLICATIONS

Arfaoui, G., et al., "A Security Architecture for 5G Networks", IEEE Access, Apr. 2018, 15 pgs.

(Continued)

*Primary Examiner* — Maikhanh Nguyen
(74) *Attorney, Agent, or Firm* — Monchai Chuaychoo, Esq.; Heslin Rothenberg Farley & Mesiti P.C.; George S. Blasiak, Esq.

(57) ABSTRACT

Methods, computer program products, and systems are presented. The method computer program products, and systems can include, for instance: obtaining service request data by a service application; generating query data for query of one or more machine learning model in dependence on the service request data; examining model data of a plurality of candidate machine learning models; selecting at least one model from the candidate machine learning models in dependence on the examining model data of the plurality of candidate machine learning models, wherein the at least one model defines a selected at least one model; and sending the query data to the selected at least one model for return of responsive prediction data.

20 Claims, 15 Drawing Sheets

(56) References Cited

U.S. PATENT DOCUMENTS

| | | | | |
|---|---|---|---|---|
| 2019/0042887 | A1* | 2/2019 | Nguyen | G06F 18/2148 |
| 2019/0065979 | A1* | 2/2019 | Shao | G06N 20/00 |
| 2019/0102693 | A1* | 4/2019 | Yates | G06N 20/00 |
| 2020/0134071 | A1* | 4/2020 | Sun | G06F 16/2425 |
| 2020/0210485 | A1* | 7/2020 | Motwani | G06Q 10/063112 |
| 2020/0272859 | A1* | 8/2020 | Lashyn | G06F 18/217 |
| 2021/0081836 | A1* | 3/2021 | Polleri | G06F 8/77 |
| 2021/0325861 | A1* | 10/2021 | Hou | G05B 19/41835 |

OTHER PUBLICATIONS

Bogale, T., et al., "Machine Intelligence Techniques for Next-Generation Context-Aware Wireless Networks", ITU Journal: ICT Discoveries, Special Issue No. 1, Feb. 2, 2018, 11 pgs.

Deloitte, "The Age of Telecom Network Automation", The Age of Telecom Network Automation | Automating Engineering and Network Operation RAN Processes, 2020, 26 pgs.

Anonymous, "Routing and Spectrum Assignment Based on Probabilistic Spectrum Availability", IPCOM000262421D, May 28, 2020, 16 pgs.

Anonymous, "Next Best Action Identification Based on Simulation of Possible Actions Outcomes Evaluated from Perspective of Scoring and Time Series Prediction", IPCOM000261625D, Mar. 23, 2020, 6 pgs.

Anonymous, "Ranking and Automatic Selection of Machine Learning Models", IPCOM000252275D, Jan. 3, 2018, 34 pgs.

Mell, Peter, et al., "The NIST Definition of Cloud Computing", NIST Special Publication 800-145, Sep. 2011, Gaithersburg, MD, 7 pgs.

Morocho-Cayamcela, E., et al., "Machine Learning for 5G/B5G Mobile and Wireless Communications: Potential, Limitations, and Future Directions", IEEE Access, Sep. 2019. Retrieved on Sep. 24, 2021 from Internet URL: https://www.researchgate.net/publication/335937022_Machine_Learning_for_5GB5G_Mobile_and_Wireless_Communications_Potential_Limitations_and_Future_Directions, 24 pgs.

"New ITU Standard to Introduce Machine Learning into 5G Networks", ITU News, Aug. 20, 2019. Retrieved on Sep. 24, 42021 from Internet URL: https://news.itu.int/new-itu-standard-machine-learning-5g-networks/, 10 pgs.

"Optimizing Network Applications for 5G—Ericsson", Apr. 21, 2017. Retrieved on Aug. 3, 2021 from Internet URL: https://www.ericsson.com/en/news/2017/4/optimizing-network-applications-for-5g, 3 pgs.

* cited by examiner

MACHINE LEARNING MODEL SELECTION

BACKGROUND

A network service can include an application running at the network application layer and above that provides data storage, manipulation, presentation, communication or other capability which is often implemented using a client-server architecture based on application layer network protocols. Each network service is usually provided by a server component running on one or more computer and accessed via a network by client components running on other devices. However, client and server components may both run on the same machine. In addition, a dedicated server computer may offer multiple network services concurrently.

Data structures have been employed for improving operation of computer system. A data structure refers to an organization of data in a computer environment for improved computer system operation. Data structure types include containers, lists, stacks, queues, tables and graphs. Data structures have been employed for improved computer system operation e.g., in terms of algorithm efficiency, memory usage efficiency, maintainability, and reliability.

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience. Machine learning has been described as the field of study that gives computers the ability to learn without being explicitly programmed.

SUMMARY

Shortcomings of the prior art are overcome, and additional advantages are provided, through the provision, in one aspect, of a method. The method can include, for example: obtaining service request data by a service application; generating query data for query of a machine learning model in dependence on the service request data; responsive to the generating of the query data, examining model data of a plurality of candidate machine learning models; selecting at least one model from the candidate machine learning models in dependence on the examining, wherein the at least one model defines a selected at least one model; and sending the query data for return of responsive prediction data to the at least one model. The method can include, in one embodiment: obtaining service request data by a service application running on a computing node; examining data of the service request data to determine a model requirement of a model to be queried by the service application; and selecting a machine learning model in dependence on the determined model requirement.

In another aspect, a computer program product can be provided. The computer program product can include a computer readable storage medium readable by one or more processing circuit and storing instructions for execution by one or more processor for performing a method. The method can include, for example: obtaining service request data by a service application; generating query data for query of a machine learning model in dependence on the service request data; responsive to the generating of the query data, examining model data of a plurality of candidate machine learning models; selecting at least one model from the candidate machine learning models in dependence on the examining, wherein the at least one model defines a selected at least one model; and sending the query data for return of responsive prediction data to the at least one model.

In a further aspect, a system can be provided. The system can include, for example a memory. In addition, the system can include one or more processor in communication with the memory. Further, the system can include program instructions executable by the one or more processor via the memory to perform a method. The method can include, for example: obtaining service request data by a service application; generating query data for query of a machine learning model in dependence on the service request data; responsive to the generating of the query data, examining model data of a plurality of candidate machine learning models; selecting at least one model from the candidate machine learning models in dependence on the examining, wherein the at least one model defines a selected at least one model; and sending the query data for return of responsive prediction data to the at least one model.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

System 100 for use in processing machine learning model (MLM) queries is shown in FIG. 1. System 100 can include, in one embodiment, orchestrator 110 and a plurality of computing nodes 10A-10Z as well as a plurality of user equipment (UE devices 120A-120Z). Computing nodes 10A-10Z can be physical computing nodes that are distributed between one or more computing environments such as the computing environments at infrastructure locations A, B, and Z (computing environments A-Z) as shown in FIG. 1. In one embodiment, computing environments A-Z can be provided by different computing environments of an edge enterprise network. System 100 can include various types of different computing environments, e.g., a computing environment provided by a UE device computing environment, an edge network computing environment, which can include, e.g., a wireless network in a fronthaul/backhaul network, a core network computing environment, or a data network computing environment.

Respective ones of computing environments A-Z include a plurality of computing nodes 10A-10Z which can be provided by physical computing nodes. Orchestrator 110, computing nodes 10A-10Z, 10, and UE devices 120A-120Z can be computing node-based devices that are in communication with one another via network 190. Network 190 can be a physical network and/or a virtual network. A physical network can be, for example, a physical telecommunications network connecting numerous computing nodes of systems such as computer servers and computer clients. A virtual network can, for example, combine numerous physical networks, or parts thereof, into a logical virtual network. In another example, numerous virtual networks can be defined over a single physical network.

Each of the different UE devices 120A-120Z can be associated to a different user. Regarding one or more UE device 120A-120Z, a computer device of one or more UE device 120A-120Z, in one embodiment, can be a UE device provided by a client computer, e.g., a mobile device, e.g., a smartphone or tablet, a laptop, smartwatch, IOT device, or PC that runs one or more program, e.g., including a web browser for opening and viewing web pages, and/or a program for data collection. UE devices 120A-120Z can be associated to users provided by individuals and/or users provided by enterprises.

Figure 1A:
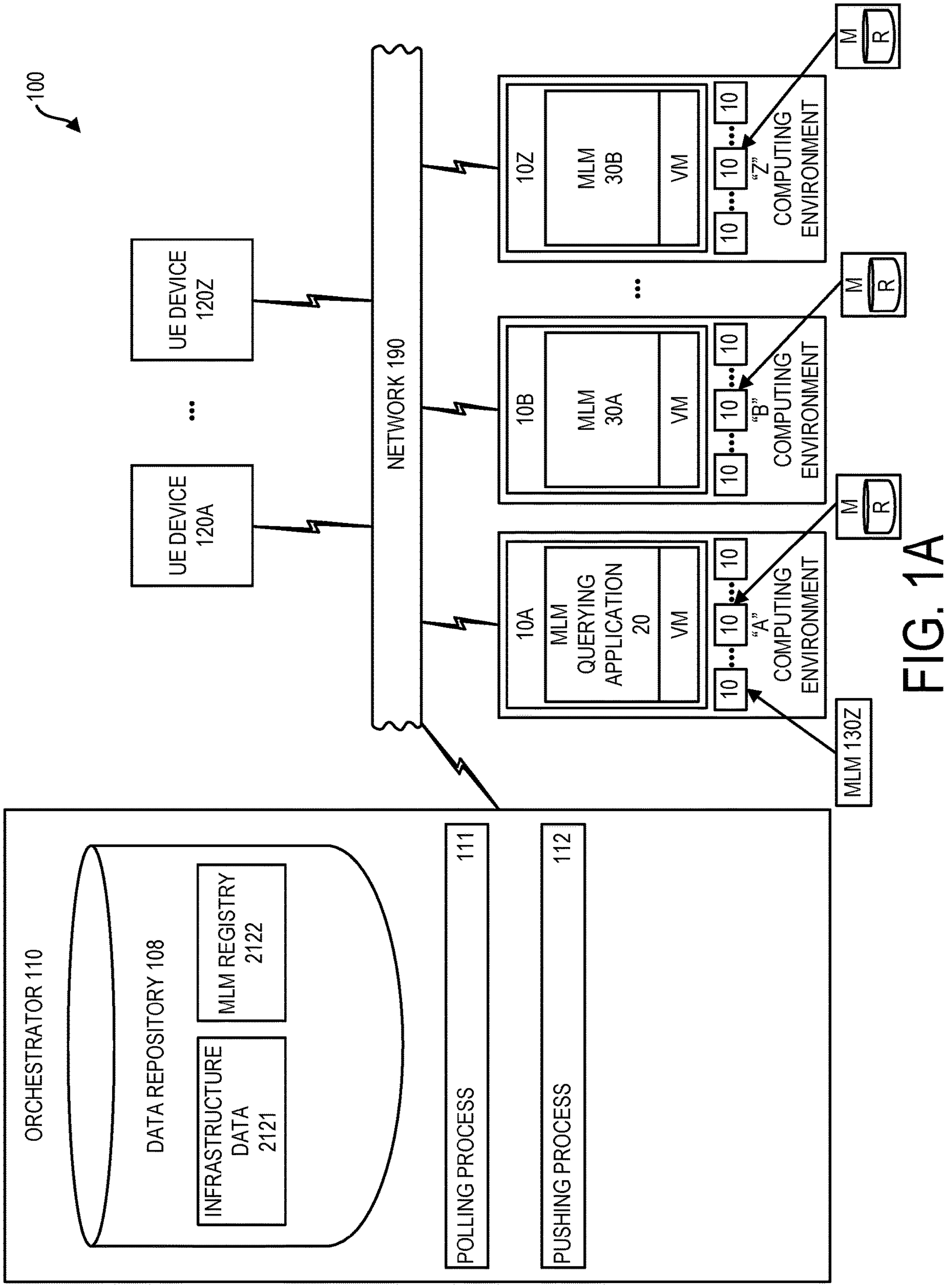
FIG. 1A depicts a system having an orchestrator, computing environments, and user equipment (UE) devices according to one embodiment.
Figure 1B:
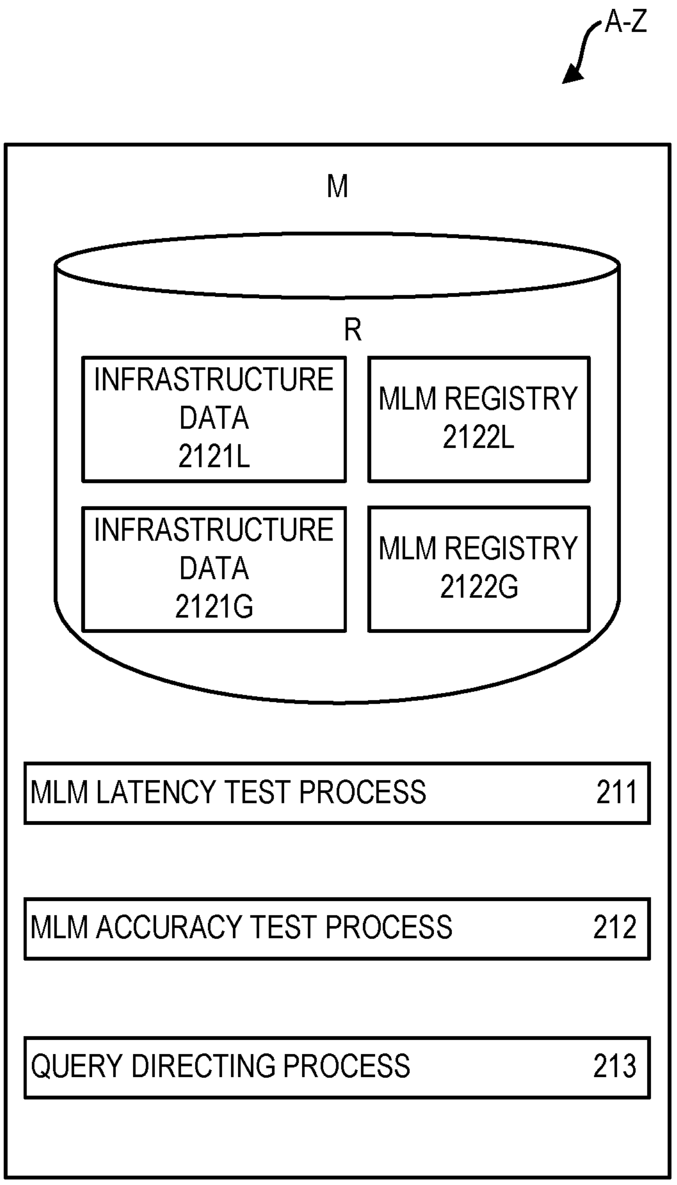
FIG. 1B depicts a manager node according to one embodiment.

As set forth in reference to FIG. 1B, the various computing environments A-Z can have respective manager nodes M configured for testing of MLMs and for data collection and distribution. As set forth in reference to FIG. 1C, functionalities herein for selection of an MLM can be incorporated in a service orchestration layer. System 100 can include a physical layer, virtual network function (VNF) at layer 2104, and service orchestration there at 2106. Physical layer 2102 can be responsible for performance of physical radio functions as well as physical functions of alternative interfaces, e.g., such functions as modulating and demodulating received radio signals and selecting appropriate communication bands or channels, and other electronic circuit transmissions. Virtual network function (VNF) layer 2104 can be responsible for such functions as updating and distributing packet routing table data that specifies computing nodes 10A-10Z, 10 for performance of routed hop by hop data communication by system 100. Service orchestration layer 2106 can include a plurality of software components as has been set forth herein, including instances of MLM querying application 20, MLMs, VMs which host MLM querying applications, and MLMs, as well as other software components set forth herein.

Embodiments herein recognize shortcomings in current methods used by computing environments to process machine learning model queries. In one example, a machine learning model associated to a machine learning model querying application can be a predetermined machine learning model located at a predetermined infrastructure location of a predetermined computing environment. In such a situation, the machine learning model, particularly when located a distance (e.g., in dependence on "hops" and/or physical distance) away from hosting location of a machine learning model querying application can exhibit undesirable latencies. In another example, a machine learning model associated to the machine learning model querying application can exhibit accuracy performance characteristics unsuitable for the application.

Embodiments herein can provide for selecting of a machine learning model associated to a machine learning model querying application that includes latency and accuracy performance characteristics suitable for machine learning querying application. Embodiments herein can provide for dynamic selecting of machine learning model associated to a machine learning model querying application that is suitable for having latency and accuracy performance characteristics suitable for the machine learning model querying application.

With further reference to system 100 as shown in FIG. 1A, computing node 10A can have running thereon a virtual machine (VM) that hosts machine learning model querying application 20. Embodiments herein recognize that machine learning models can be trained to provide responses to a variety of different queries. The machine learning model (MLM) querying application 20 can be, e.g., any service application that queries any machine learning model, e.g., can be an application that queries an MLM to return a financial loan default prediction, that queries an MLM to return a medical health condition prediction, or that queries an MLM for return of any other arbitrary prediction.

MLM querying application 20 can run a natural language processing (NLP) process for determining one or more NLP output parameter of a message. The NLP process can include one or more of a topic classification process that determines topics of messages and output one or more topic NLP output parameter, a sentiment analysis process which determines sentiment parameter for a message, e.g., polar sentiment NLP output parameters, "negative," "positive," and/or non-polar NLP output sentiment parameters, e.g., "anger," "disgust," "fear," "joy," and/or "sadness" or other classification process for output of one or more other NLP output parameters e.g., one of more "social tendency" NLP output parameter or one or more "writing style" NLP output parameter.

By running of the described NLP process, MLM querying application 20 can perform a number of processes including one or more of (a) topic classification and output of one or more topic NLP output parameter for a received message, (b) sentiment classification and output of one or more sentiment NLP output parameter for a received message, or (c) other NLP classifications and output of one or more other NLP output parameter for the received message.

Topic analysis for topic classification and output of NLP output parameters can include topic segmentation to identify several topics within a message. Topic analysis can apply a variety of technologies, e.g., one or more of Hidden Markov model (HMM), artificial chains, passage similarities using word co-occurrence, topic modeling, or clustering. Sentiment analysis for sentiment classification and output of one or more sentiment NLP parameter can determine the attitude of a speaker or a writer with respect to some topic or the overall contextual polarity of a document. The attitude may be the author's judgment or evaluation, affective state (the emotional state of the author when writing), or the intended emotional communication (emotional effect the author wishes to have on the reader). In one embodiment, sentiment analysis can classify the polarity of a given text as to whether an expressed opinion is positive, negative, or neutral. Advanced sentiment classification can classify beyond a polarity of a given text. Advanced sentiment classification can classify emotional states as sentiment classifications. Sentiment classifications can include the classification of "anger," "disgust," "fear," "joy," and "sadness."

Computing node 10B can have running thereon a virtual machine (VM) which hosts machine learning model (MLM) 30A. Computing node 10Z can have running thereon a VM, and there can be running on top of the VM, MLM 30B. In the described embodiment of FIG. 1A, MLM 130Z can be running on a VM hosted by computing node 10 at computing environment location A. In one embodiment, there can be, e.g., tens, hundreds, thousands, or millions of MLMs, e.g., MLMs 30C-30Y distributed throughout different computing environments of system 100. The MLMs 30C-30Y can be distributed to be running on computing nodes 10A-10Z, 10 of computing environments throughout system 100.

FIG. 1A depicts an arrangement where there is a one-to-one association between MLMs and computing environments. The depicted arrangement is for illustrative purposes only and alternative arrangements are possible. In one example, a first computing environment can have one MLM and a second computing environment of computing environments A-Z can have N MLMs. In another example, a first computing environment of computing environments A-Z can have zero MLMs, and a second computing environment can have M MLMs. Thousands to millions of MLMs can be distributed throughout the computing environments of system 100 according to one embodiment.

Orchestrator 110 can have an associated data repository 108 and can run various processes including polling process 111 and pushing process 112. Data repository 108 in infrastructure data area 2121 can store performance metrics data specifying performance metrics associated to infrastructure of system 100. Data repository 108 in infrastructure data area 2121 can store performance metrics data associated to the various computing environment locations of system 100.

Infrastructure data area 2121 can store data specifying performance metrics of computing nodes of various computing environments of system 100, as well as performance metrics data of various VMs running on such computing nodes. Data repository 108 in infrastructure data area 2121 can store an infrastructure map that specifies locations including geospatial coordinate locations of each computing node 10A-10Z, 10 within system 100. There can be provided in infrastructure data area 2121 identifiers for computing nodes specifying the geospatial locations of such computing nodes, as well as a computing environment identifier for the various respective computing nodes.

Data repository 108 in MLM registry area 2122 can store performance data performance metrics data of MLMs 30A-30Z running in system 100. Performance metrics data including performance metrics data stored in MLM registry area 2122 can include such data as (a) an MLM identifier for each specific MLM, (b) the model technology classification(s) of each respective MLM, (c) training data parameters for training the specific MLM, (d) latency performance metrics data associated to each respective MLM of system 100, as well as (e) accuracy performance metrics data associated to each respective MLM of system 100. Technology classifications for MLMs can include, e.g., neural network (NN), support vector machine (SVM), linear regression, Holt-Winter, ARIMA, random forest, and others.

Orchestrator 110 running polling process 111 can poll respective computing environments A-Z for return of infrastructure performance metrics data as well as MLM performance metrics data. In one aspect, respective computing environments A-Z can include a computing node 10 configured as a manager node M as indicated in FIGS. 1A and 1B. As described further in reference to FIG. 1A and FIG. 1B, the respective manager nodes M can have an associated data repository R defined in a system memory of manager node M. A system memory associated to a computing node herein can be, e.g., a dedicated system memory or associated to one computing node or can be, e.g., a shared storage volume system memory, or can be a system memory including a shared storage volume in communication with the computing node by way of a storage area network (SAN).

Each respective computing environment manager node M can be configured to collect infrastructure data that includes infrastructure performance metrics data that specifies performance attributes of computing nodes 10A-10Z, 10 of each respective computing environment A-Z and can also collect performance metrics data of any VMs running on such computing nodes. For such functionality, computing nodes and VMs associated to each respective computing environment can include agent programs that communicate infrastructure performance metrics data to a primary program running on manager node M.

The manager node M associated with each computing environment A-Z can also collect MLM performance metrics data. For collection of MLM performance metrics data, a manager node M can send test query data to each MLM running within its own computing environment and monitor return result data to ascertain a latency metrics parameter value associated to such test query data. Manager node M of respective computing environments A-Z can also run accuracy performance tests with respect to each respective MLM running on a computing node within the computing environment associated to a manager node M. For performance of an accuracy performance test, a respective manager node M associated to each respective computing environment of system 100 can launch a test using holdback data as set forth herein. Over time, each respective manager node M can update a local version of infrastructure data area 2121 and MLM registry 2122 based on the return infrastructure performance metrics data and MLM performance metrics data. MLMs running within computing environments of computing environments A-Z can be hosted on VMs, which VMs can be running on computing nodes 10A-10Z, 10 provided by physical computing nodes.

Orchestrator 110 running polling process 111 can include orchestrator 110 polling respective data repositories R of respective managers M of the various computing environments A-Z in order to return copies of the returned local infrastructure performance metrics data and MLM registry performance metrics data stored in the respective data repositories R for storage into infrastructure data area 2121 and MLM registry 2122 of data repository 108 of orchestrator 110. Thus, by running polling process 111, orchestrator 110 updates infrastructure data area 2121 and MLM registry area 2122 in order to include at all times recent and comprehensive infrastructure performance metrics data and MLM performance metrics data for all computing nodes 10.

Orchestrator 110 running pushing process 112 can iteratively push updated infrastructure data of infrastructure data area 2121 and MLM performance metrics data of MLM registry 2122 to each respective data repository R of the respective managers M of the various computing environments A-Z as depicted in FIG. 1. Accordingly, the respective data repositories R associated to the various managers M of the respective computing environments at computing environments A-Z can at all times have updated infrastructure performance metrics data of computing nodes and of virtual machines running on such computing nodes of all computing environments within system 100, as well as updated MLM performance metrics data of all MLMs which can be running on virtual machines of all of the various computing environments at computing environments A-Z which virtual machines can be hosted on respective computing nodes 10A-10Z, 10 of such computing environments A-Z. Performance metrics data returned for computing nodes 10A-10Z, 10 and hosted VMs can include service level agreement (SLA) performance metrics parameters, e.g., availability of the Service (uptime) performance metrics parameters, latency (response time), and service components reliability.

A network schematic view of system 100 is shown in FIGS. 2A-2D. System 100 can include UE devices 120A-120Z in communication with data network 2000N via a plurality of edge enterprise entity networks (edge entity networks) 1000N, one of which is shown. Respective edge entity networks 1000N can include edge infrastructure owned, operated, and/or controlled by respective different edge entities. An edge enterprise entity can own, operate, and/or control the edge network infrastructure comprising wireless network 1100N, fronthaul/backhaul network 1200N, and core network 1300N. In one embodiment, different respective ones of the edge enterprises can be telecommunications network providers which are sometimes referred to as communication service providers (edge enterprise entity CSPs). Wireless network 1100N can include base stations 15A-15Z, which can be provided by eNodeB base stations, according to one embodiment.

In the described embodiment of FIGS. 2A-2D, the combination of wireless network 1100N and fronthaul/backhaul network 1200N can define edge network 500N provided by a radio access network (RAN) 500N. Edge network 500N can define edge infrastructure. The depicted RAN 500N provides access from UE devices 120A-120Z to respective core networks 1300N. In an alternative embodiment, one or more of edge networks 500 can be provided by a content delivery network (CDN). UE devices 120A-120Z and RAN 500N can be compliant with the New Radio (NR) standard, and documents of 3GPP TS 28.530 V15.1.0 Release 15 by the 3$^{rd}$ Generation Partnership Project (3GPP) and the technical reports of Release 16 of the 3GPP (3GPP Release 16 reports).

Each of the different UE devices 120A-120Z can be associated to a different user. A UE device of UE devices 120A-120Z, in one embodiment, can be a computing node device provided by a client computer, e.g., a mobile device, e.g., a smartphone or tablet, a laptop, smartwatch or PC that runs one or more program that facilitates access to services by one or more service provider. A UE device of UE devices 120A-120Z can alternatively be provided by, e.g., an internet of things (IOT) sensing device.

Embodiments herein recognize that hosting service functions on one or more computing node within an edge entity network 1000N can provide various advantages including latency advantages for speed of service delivery to end users at UE devices 120A-120Z. Edge enterprise entity hosted service functions can be hosted, e.g., within edge network 500N or otherwise within edge entity network 1000N.

Data network 2000N can include, e.g., an IP multimedia sub-system (IMS) and/or "the internet" which can be regarded as the network of networks that consists of private, public, academic, business, and government networks of local to global scope linked by a broad array of electronic, wireless, and optical networking technologies. Data network 2000N can include, e.g., a plurality of non-edge data centers. Such data centers can include private enterprise data centers as well as multi-tenancy data centers provided by IT enterprises that provide for hosting of service functions developed by a plurality of different enterprise entities.

Some edge enterprise entities that own, operate, and/or control edge infrastructure such as provided by an edge network 500N can offer multi-tenancy hosting services that permit enterprises other than edge enterprises to host their applications on one or more edge node within edge entity network 1000N.

Orchestrator 110, according to one embodiment, can be deployed on a computing node of core network 1300N. According to another embodiment, orchestrator 110 can be deployed on one or more computing node of data network 2000N. According to one embodiment, orchestrator 110 can be distributed between computing nodes of core network 1300 and data network 2000N. According to one embodiment, orchestrator 110 can be co-located on computing nodes of core network 1300 and data network 2000N. A management and orchestration (MANO) computing environment, in one embodiment, can be provided in accordance with the documents of 3GPP TS 28.530 V15.1.0 Release 15 by the 3$^{rd}$ Generation Partnership Project (3GPP) and the technical reports of Release 16 of the 3GPP (3GPP Release 16 reports).

Figure 2A:
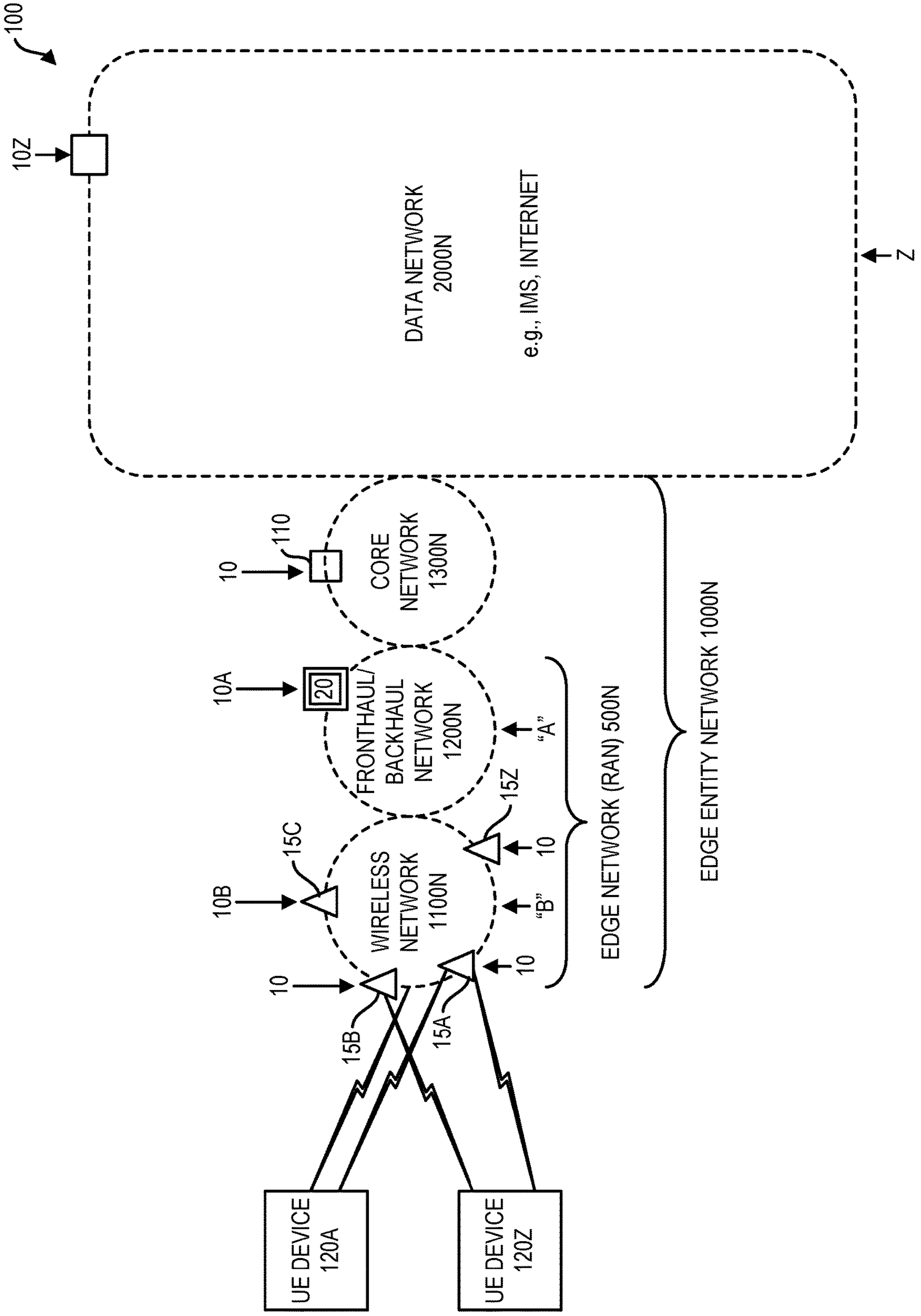
FIG. 2A depicts a system having an edge network, a core network, and a data network, according to one embodiment.

FIG. 2A illustrates one example of an integration scheme for computing nodes within system 100. In the embodiment of FIG. 2A, computing node 10A hosting MLM querying application 20 is included within fronthaul/backhaul network 1200N which defines the computing environment at infrastructure location A (computing environment A of FIG. 1A), and computing node 10B is provided by a computing node of base station 15C of wireless network 1100N which defines the computing environment of infrastructure location B shown in FIG. 1A (computing environment A of FIG. 1A). Computing node 10Z is a computing node of data network 200N which defines the computing environment of infrastructure location Z as shown in FIG. 1A. Over time, while a service is being provided, MLM querying application 20 and/or MLMs can migrate. For example, during the providing of a service where, e.g., desirability of reduced latency operation has been sensed by orchestrator 110, orchestrator 110 can trigger the live migration of MLM querying application 20 from a computing node 10A fronthaul/backhaul network 1200N to a computing node 10 wireless network 1100N, e.g., to be hosted on a computing node 10 of base station 15B, for example.

Figure 2B:
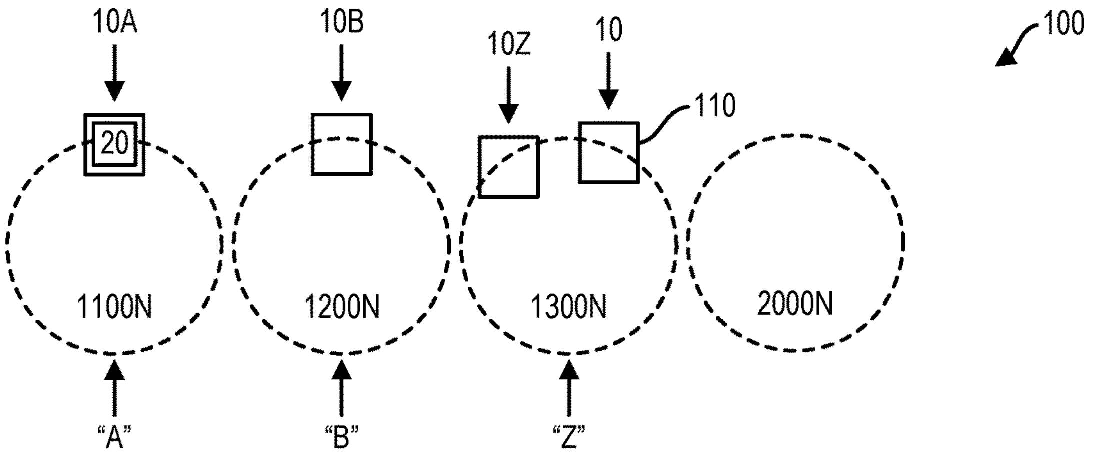
FIG. 2B depicts a system having an edge network, a core network, and a data network, according to one embodiment.
Figure 2C:
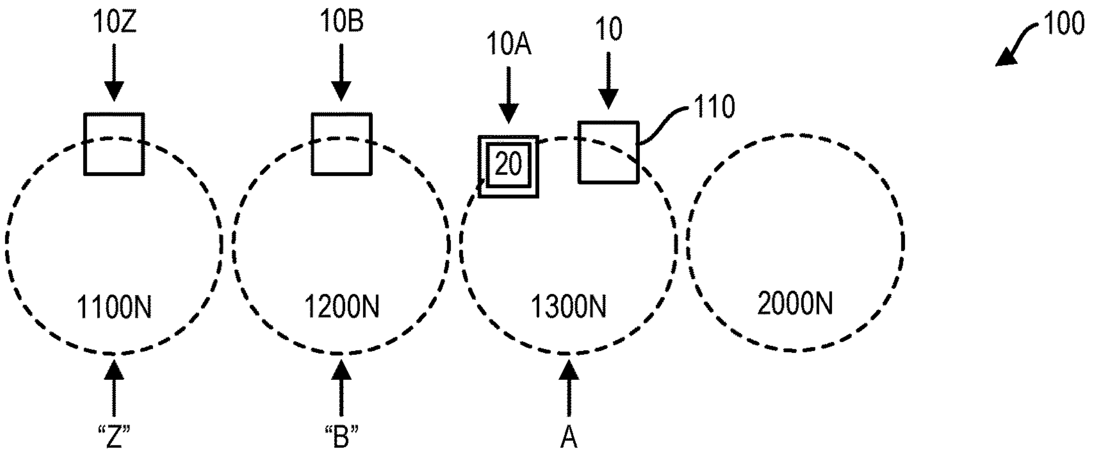
FIG. 2C depicts a system having an edge network, a core network, and a data network, according to one embodiment.
Figure 2D:
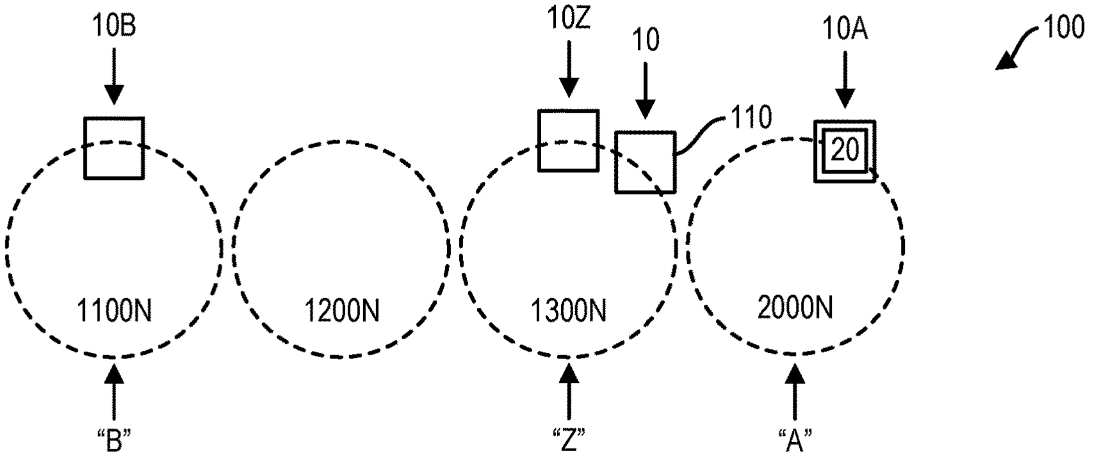
FIG. 2D depicts a system having an edge network, a core network, and a data network, according to one embodiment.

Orchestrator 110 can be configured to trigger the migration of MLMs as well. For example, MLM 30B depicted in FIG. 1A as being hosted on computing node 10Z, which in FIG. 2A is a computing node of data network 200N, can migrate to a computing node, e.g., one of wireless network 1100N, fronthaul/backhaul network 1200N, or core network 1300N. FIG. 2B illustrates another example. In the example of FIG. 2B, the computing environment at infrastructure location A having computing node 10A can be provided by wireless network 1100N. The computing environment of infrastructure location B can be provided by fronthaul/backhaul network 1200N and can include computing node 10B. The computing environment at infrastructure location Z having computing node 10Z can be provided by core network 1300N. In the example of FIG. 2C, the computing environment of infrastructure location Z can be provided by core network 1300N. The computing environment of infrastructure location B having computing node 10B can be provided by fronthaul/backhaul network 1200N, and the computing environment of infrastructure Z having computing node 10Z can be provided by wireless network 1100N. In the example of FIG. 2D, the computing environment of infrastructure location A having computing node 10A can be provided by data network 200N. The computing environment of infrastructure Z having computing node 10Z can be provided by core network 1300N, and the computing environment of infrastructure location B having computing node 10B can be provided by wireless network 1100N.

In one embodiment, orchestrator 110 can be hosted on computing node 10 of core network 1300N as depicted in FIGS. 2A-2D. Orchestrator 110 can alternatively be hosted elsewhere, e.g., on a computing node of data network 2000N on fronthaul/backhaul network 1200N or wireless network 1100N.

Orchestrator 110 can alternatively be distributed between different infrastructure computing environments and/or can be redundantly hosted on different infrastructure computing environments.

System 100 as set forth herein, including in reference to FIG. 1A and FIGS. 2A-2D, can be compliant with Fifth Generation (5G) technologies, including the New Radio (NR) standard, documents of 3GPP TS 28.530 V15.1.0 Release 15 by the 3rd Generation Partnership Project (3GPP), and the technical reports of Release 16 of the 3GPP (3GPP Release 16 reports).

A method for performance by orchestrator 110 interoperating with computing environment A, computing environment B, and computing environment Z as well as UE devices 120A-120Z is described with reference to the flowchart of FIG. 3. At blocks 1101, 1102, and 1103, orchestrator 110 can be sending request data to manager nodes M of respective ones of computing environments A-Z in response to respective manager nodes M as shown in FIG. 1A and can return most recent local performance metrics data stored in respective data repositories R of the various computing environments at respective send blocks 1201, 1301, and 2301. Local performance metrics data sent to orchestrator 110 at blocks 1201, 1301, and 2301 can include local infrastructure performance metrics data respecting the performance of computing nodes and virtual machines, as well as local MLM performance metrics data respecting latency performance and accuracy performance of MLMs running on virtual machines that are hosted on computing nodes of the respective local computing environments A-Z.

In response to the receipt of the described local performance metrics data, orchestrator 110 at update block 1104 can update infrastructure data area 2121 and MLM registry 2122 of data repository 108 to include updated global infrastructure performance metrics data and MLM performance metrics data. In response to completion of block 1104, orchestrator 110 can proceed to send block 1105. At send block 1105, orchestrator 110 can send the updated global performance metrics data to the various manager nodes M of computing environments A-Z so that the local computing environment data repositories R associated to the various manager nodes M of the various computing environments are updated to include most recent global performance metrics data including global infrastructure performance metrics data and MLM performance metrics data respecting, in one embodiment, all computing nodes 10A-10Z, 10, all VMs of system 100, and all MLMs running in system 100.

In response to completion of block 1105, orchestrator 110 can loop back to block 1101 and can be iteratively performing the loop of blocks 1101-1105 during the deployment period of orchestrator 110. MLMs herein can be trained for image processing, loan applications, recommendations to user on viewing choices, and fraud detection. Referring further to the flowchart of FIG. 3, UE devices 120A-120Z at block 1201 can be sending service request data for receipt by MLM querying application 20 running on computing node 10A within computing environment A. The service request data can be service request data to invoke a query on an MLM configured for a certain prediction, e.g., a financial loan prediction, a medical diagnostic prediction, or another prediction. MLM querying application 20 can process obtained service request data and can generate MLM query data for querying an MLM in dependence on the service request data. Service request data can be any user-defined or UE device-defined data sent to a service application, which can be a service application for any purpose.

At analyzing block 1203, MLM querying application 20 can be analyzing the service request data to ascertain latency and accuracy performance targets for the incoming service request. For determining a latency requirement, MLM querying application 20 can apply Eq. 1 as follows:

$$LS = LF1W1 + LF2W2 + LF3W3 + LF4W4 \quad \text{(Eq. 1)}$$

Where LS is a composite latency target scoring value, LF1 is a first factor, LF2 is a second factor, and LF3 is third factor and where W1, W2, and W3 are respective weights associated to the various factors. According to one embodiment, LF1 can be a sentiment factor, LF2 can be a topic factor, LF3 can be a geospatial location factor, and LF4 can be a biometric sensor factor.

It will be understood that MLM querying application 20 can invoke different configurations including weights according to Eq. 1 depending on characterizing data including data specifying the prediction to be provided by a selected model. Regarding the sentiment factor LF1, MLM querying application 20 can subject incoming user-defined data, e.g., textual data or voice data converted into text to natural language processing (NLP), in order to return a sentiment parameter value. According to the sentiment factor LF1, MLM querying application 20 can assign a higher than baseline scoring value under factor SF1 in the case that a negative sentiment is sensed and can assign a lower than baseline value in the case that a positive sentiment is sensed.

Regarding a topic factor LF2, some topics can be assigned higher scoring values than other detected topics. Topics can be detected again with use of natural language processing operating on user-defined text, originally entered, or converted from voice. In one qualifying MLM scenario, some detected topics can be assigned higher scoring values than other detected topics. For example, if the topic rent or eviction is detected in association with a loan default prediction MLM query, MLM querying application 20 might assign a higher than baseline scoring value under factor LF2, and in the case that a topic such as vacation or "Hawaii" is detected (less urgency for the request), MLM querying application 20 might assign a lower than baseline scoring value under factor LF2. Regarding factor LF3, MLM querying application 20 can assign different latency requirement scoring values under factor LF2 depending on detected geography. In one example, system 100 can be in communication with an emergency support service application that assigns emergency conditions to various geospatial locations such as emergencies associated to fires, crime, infectious disease. Under factor LF3, MLM querying application 20 can assign a higher than baseline scoring value under factor LF3 in the case that a current location is associated to an emergency condition and can assign a lower than baseline scoring value in the case that an emergency condition is not associated to a current location of a UE device sending service request data. Service request data sent at block 1201 can include a geostamp specifying a location of the device sending the service request data. The described emergency condition processing can be applied in the case that a predictive model to be queried is a medical diagnostic-related predictive model. In the case of a financial loan processing prediction, the factor LF3 geoprocessing can include consideration, e.g., of whether a UE device sending service request data is in a business office location or a non-business office location, according to one embodiment.

Regarding factor F4, MLM querying application 20 can assign scoring values under factor LF4 in dependence on sensor output data output by a sensor of the UE device 120A-120Z sending the service request data. A biometric sensor can be provided, e.g., by a pulmonary sensor such as a blood pressure sensor or heart rate sensor. In one embodiment, MLM querying application 20 can assign higher than baseline scoring values under factor LF4 in the case that a higher than normal blood pressure or heart rate is detected and can assign lower than baseline scoring values under factor LF4 in the case that blood pressure or heart rate is detected in a normal range.

MLM querying application 20 at analyzing block 1203 can apply Eq. 2 for assigning an accuracy requirement to incoming service request data.

$$AS = AFW1 + AFW2 + AFW3 + AFW4 \quad \text{(Eq. 4)}$$

Where AS is an accuracy scoring value indicating the level of accuracy required for a prediction that will use a selected machine learning model, where AF1 is a first accuracy factor, AF2 is a second accuracy factor, AF3 is a third accuracy factor, and AF4 is a fourth accuracy factor, and where W1-W4 are weights associated to the various factors.

According to one embodiment, AF1 can be a sentiment factor, AF2 can be a topic factor, AF3 can be a geospatial location factor, and AF4 can be a biometric sensor factor.

It will be understood that MLM querying application 20 can invoke different configurations according to Eq. 1 depending on characterizing data of an MLM to be queried including data specifying the prediction subject matter to be provided by a selected model. Regarding the sentiment factor, MLM querying application 20 can subject incoming user defined data, e.g., textual data or voice data converted into text to natural language processing (NLP) in order to return a sentiment parameter value. In one embodiment, according to the sentiment factor AF1, MLM querying application 20 can assign a higher than baseline scoring value under factor SF1 in the case that a negative sentiment (e.g., the case of a customer with an urgent problem) is sensed and can assign a lower than baseline value in the case that a positive sentiment is sensed.

Regarding a topic factor AF2, some sensed topics can be assigned higher accuracy scoring values than other detected topics. Topics can be detected again with use of natural language processing operating on user-defined text, originally entered, or converted from voice. In one MLM scenario, some detected topics can be assigned higher scoring values than other detected topics. For example, if the topic "triage" is detected in association with a medical diagnostic prediction MLM query, MLM querying application 20 might assign a lower than baseline scoring value under factor AF2 (less accuracy is targeted) and in the case that a topic such as "insurance" is detected (more accuracy targeted for request) in association with a medical diagnostic prediction MLM query, MLM querying application 20 might assign a higher than baseline scoring value under factor AF2.

Regarding factor AF3, MLM querying application 20 can assign different accuracy target scoring values under factor AF3 depending on detected geospatial coordinate location. In one example, system 100 can be in communication with an emergency support service application that assigns emergency conditions to various geospatial locations such as emergencies associated to fires, crime, infectious disease. Under factor AF3, MLM querying application 20 can assign a lower than baseline scoring value under factor AF3 (less accuracy tolerated) in the case that a current location is associated to an emergency condition and can assign a higher than baseline scoring value in the case that an emergency condition is not associated to a current location of a UE device sending service request data.

Service request data sent at block 1201 can include a geostamp specifying a location of the device sending the service request data. The described emergency condition processing can be applied in the case that a predictive model to be queried is a medical diagnostic-related predictive model. In the case of a financial loan processing prediction, the factor AF3 geoprocessing can include consideration, e.g., of whether a UE device sending service request data is in a business office location or a non-business office location, according to one embodiment.

Regarding factor AF4, MLM querying application 20 can assign scoring values under factor AF4 in dependence on sensor output data output by a sensor of the UE device 120A-120Z sending the service request data. A biometric sensor can be provided, e.g., by a pulmonary sensor such as a blood pressure sensor or heart rate sensor. In one embodiment, MLM querying application 20 can assign a lower than baseline (less accuracy tolerated) scoring value under factor AF4 in the case that a lower than normal blood pressure or heart rate is detected and can assign lower than baseline scoring values under factor AF4 in the case that blood pressure or heart rate is detected in a normal range.

At examining block 1204, MLM querying application 20 can perform examining of infrastructure data including infrastructure performance metrics data and MLM performance metrics data to ascertain a set of most suitable MLMs hosted within system 100 for performance of a prediction.

At examining block 1204, MLM querying application 20 can filter out certain MLMs and in some embodiments, the vast majority of MLMs running in system 100 based on the subject matter of the prediction being performed. In one embodiment, MLM querying application 20 can include program embedded characterizing data that characterizes MLM queries that are generated by MLM querying application 20. MLM characterizing data can include, e.g., a set of minimal parameter values that define training data for training a qualifying MLM. MLM querying application 20 can qualify an MLM of system 100 for further examining at block 1204 if the MLM running in system 100 includes the minimal specified training parameters. Minimal training parameters in the case of a loan processing prediction can include such parameters as employment status, cash savings, and current debt. MLM querying application 20 can disqualify an MLM of system 100 from further examining at block 1204 if the MLM running in system 100 does not include the minimal specified training parameters. Minimal training parameters in the case of a loan processing prediction can include such parameters as employment status, cash savings, and current debt.

In performing examining at block 1204, MLM querying application 20 can bias MLM latency data stored in data repository R associated to manager M of computing environment A using infrastructure data of infrastructure data area 2121 sent at block 1105 and updated at block 1202. Embodiments herein recognize that the global performance metrics data sent at block 1105 can include local MLM latency data collected as a result of local manager node M querying a local MLM within its own computing environment. At examining block 1204, however, MLM querying application 20 can be ascertaining latency performance of MLMs such as MLM 30A and MLM 30B shown in FIG. 1A that are hosted on computing nodes 10B and 10Z respectively of computing environments external from computing environment A shown in FIG. 1A.

For biasing a latency metric value associated to an MLM, MLM querying application 20 can apply a biasing factor in dependence on a number of hops, and/or in dependence on physical distance between a location of computing node 10A hosting MLM querying application 20 and the computing node 10B or 10Z hosting the MLM being examining at block 1204. MLM querying application 20 can also apply a biasing factor to returned MLM performance metrics data using collected SLA infrastructure metrics data that has been returned for computing nodes 10A-10Z, 10 and VMs. For example, a latency score for an MLM can be biased by an SLA infrastructure latency metrics parameter value for the MLM's hosting computing node and hosting VM, and accuracy score for an MLM can be a biased by an SLA infrastructure reliability metrics parameter value for the MLM's hosting computing node and hosting VM.

At block 1205, MLM querying application 20 can perform selecting of a suitable set of MLMs for querying in dependence on the analyzing at block 1203 and examining at block 1204. At selecting block 1205, MLM querying application 20, according to one embodiment, can perform K-means clustering selection. As a result of the examining at block 1204, MLM querying application 20 can plot in X-Y coordinate space, a data coordinate point specifying latency and accuracy targets. Referring to the illustrative data in FIG. 4, MLM querying application 20 at block 1205 can plot target performance coordinates 4002 specifying the target latency (Y axis) and accuracy (X axis) for an MLM responding to the incoming service request data as determined in examining block 1204 applying Eq. 1 and Eq. 2, and can plot coordinate values 4011 to 4018 as a result of the data returned by performance of examining block 1205 which specifies the biased performance metrics being exhibited by each candidate MLM. Each qualifying candidate MLM of system 100 can be plotted in terms of its biased latency performance metrics data as well as accuracy performance metrics data as determined using holdback data as set forth herein.

Figure 4:
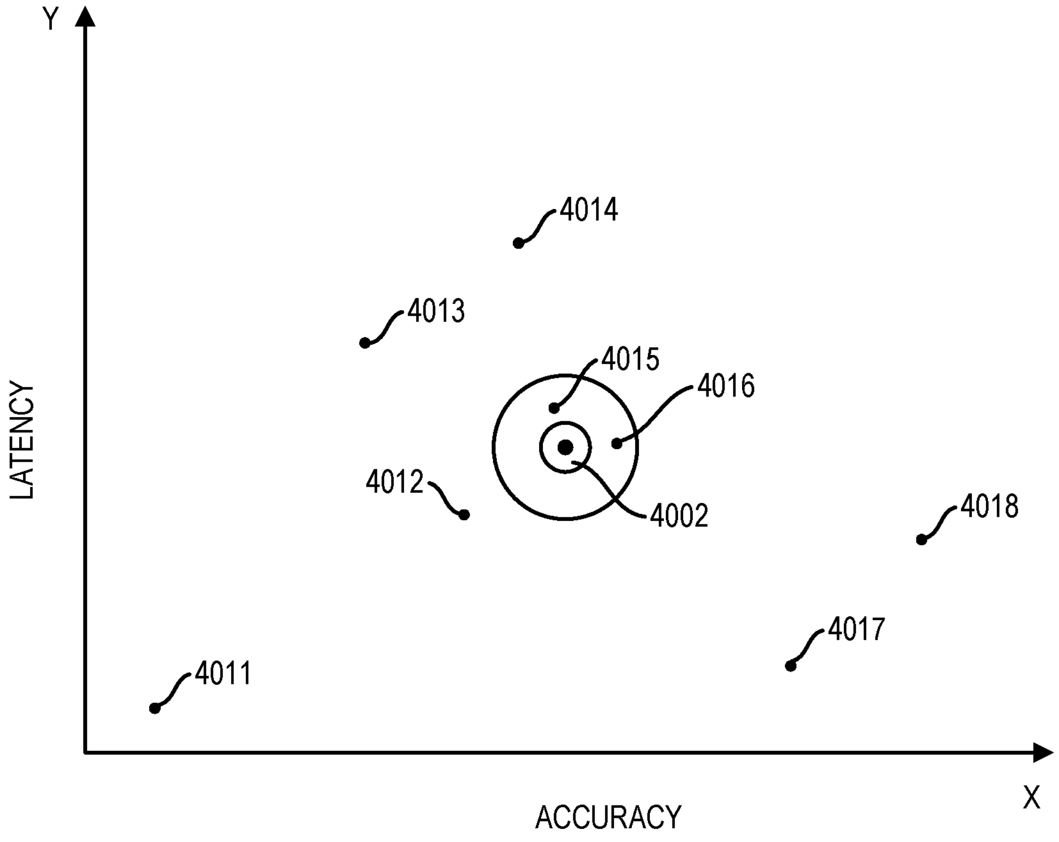
FIG. 4 is a diagram depicting machine learning model selection with use of K means clustering according to one embodiment.

At selecting block 1205, MLM querying application 20 can select a set of N MLMs for use in handling MLM queries as defined by incoming service request data. MLM querying application 20 can select the best N MLMs applying K-means clustering and selecting with reference to FIG. 4 a set of MLMs, e.g., those depicted by coordinate points 4012, 4015, and 4016 having the smallest Euclidean distance from the requirement coordinates 4002 as depicted in FIG. 4. In the described example, MLM querying application 20 can select the coordinate points depicted as coordinate points 4015 and 4016 of FIG. 4 having the smallest Euclidean distance to the target performance coordinates 4002. The selecting of the set of MLMs at block 1205 can establish a set of models for deployment in a weighted ensemble model arrangement for handling the incoming service request data. The weights of the selected set of models deployed in an ensemble model arrangement can be determined by the order of proximity to target performance coordinates 4002 illustrated in FIG. 4.

Figure 3:
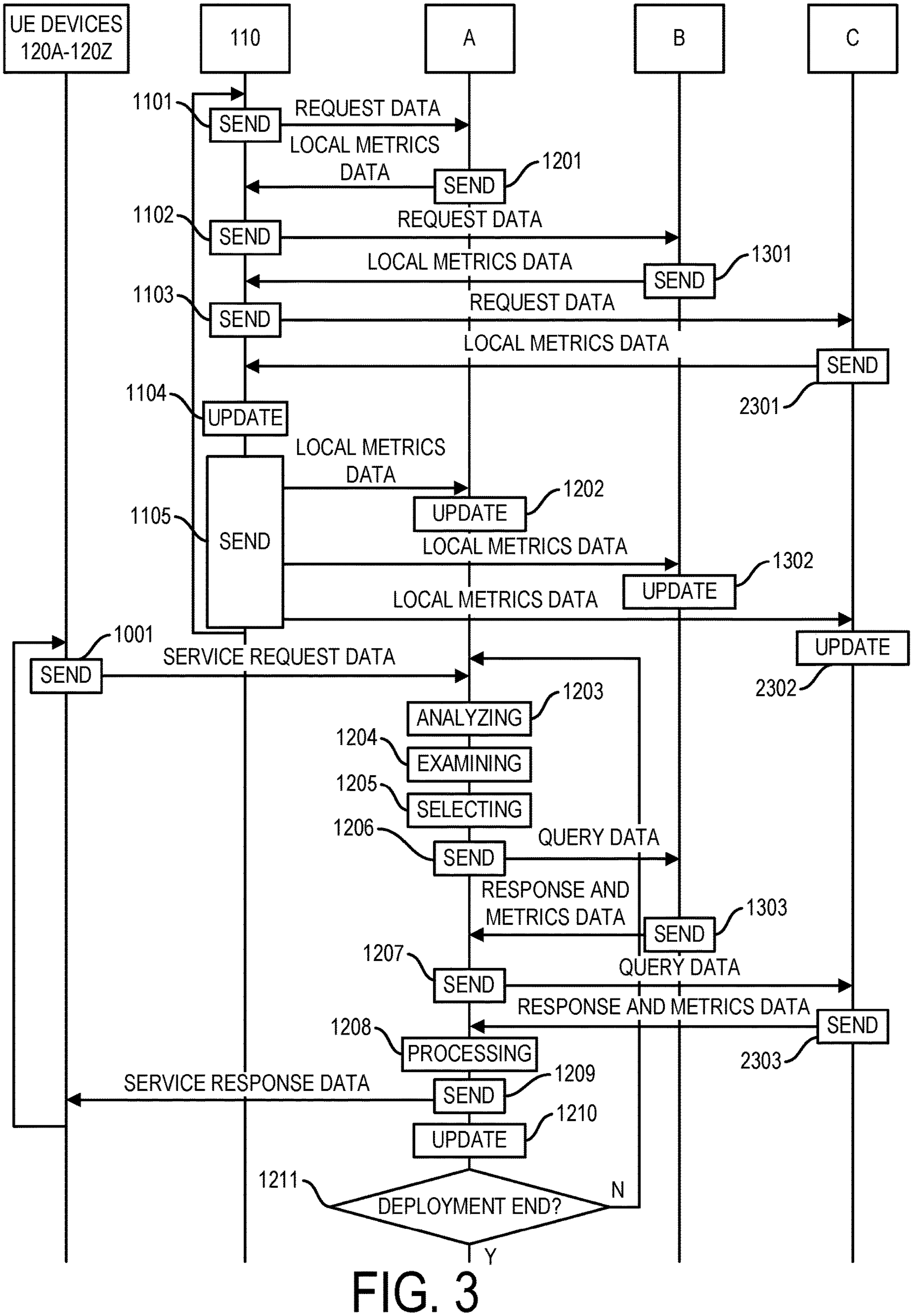
FIG. 3 depicts a method for performance by an orchestrator interoperating with different computing environments, and with UE devices according to one embodiment.

In the described scenario of the flowchart of FIG. 3, the set of selected models can include first and second models, i.e., MLM 30A running on a VM hosted on computing node 10B and MLM 30B running on a VM hosted on computing node 10Z. At blocks 1206 and 1207, MLM querying application 20 can send query data for querying the respective models MLM 30A and MLM 30B running on computing node 10Z. At block 1303, MLM 30A of computing environment B can send response and performance metrics data to MLM querying application 20 and at block 2303, and MLM 30B running on computing environment Z can send response and performance metrics data to MLM querying application 20.

Performance metrics data sent at blocks 1303 and 2303 can include live performance metrics data that specifies the actual latency performance metrics of MLM 30A running on computing node 10B of computing environment B and MLM 30B running on computing node 10Z of computing environment Z. Embodiments herein recognize that the live latency MLM performance metrics data sent at blocks 1303 and 2303 determined heuristically can have a higher degree of reliability than the global performance metrics data, including latency performance metrics data sent at block 1105 biased by the examining at block 1204 using infrastructure data, e.g., infrastructure data specifying a number of hops between nodes.

In response to completion of block 1207, MLM querying application 20 can proceed to block 1208. At block 1208, MLM querying application 20 can use the result of response data from the MLMs sent from MLM 30A and MLM 30B at blocks 1303 and 2303. MLM querying application 20 can send MLM response data to the UE device sending the service request data at block 1201. At block 1210, MLM querying application 20 can perform updating of data repository R of manager node M associated to computing environment A in which MLM querying application 20 is hosted. The updating at block 1210 can include updating so that MLM latency performance metrics data can be updated with the live latency performance metrics data sent at blocks 1303 and 2303.

At block 1211, MLM querying application 20 can ascertain whether a deployment period has ended for MLM querying application 20 and if not, can loop back to receive and process next service request data which can be generated by the same or different UE device of UE devices 12A-12Z. Throughout a deployment period of MLM querying application 20, MLM querying application 20 can perform the loop of blocks 1201-1211.

Embodiments herein recognize that as a result of the iterative performance of the loop of blocks 1203-1211, the set of MLMs selected for use in handling service request data at selecting block 1205 can dynamically change. In one example with reference to FIG. 2A, the VM on which MLM querying application 20 can be migrated to a different computing node, for example, can be migrated from computing node 10A of computing environment A to a computing node 10 of base station 15B of wireless network 1100 N (FIG. 2A, according to one example). Embodiments herein recognize that such migration during a deployment period of application of MLM querying application 20 can impact the performance of examining at block 1204. More specifically, the biasing factors used for biasing latency performance metrics data obtained from global performance metrics data pushed at block 1105 can be changed to reflect the new migrated location of the VM on which MLM querying application 20 runs and thus will change the coordinate values of candidate MLMs plotted as described in FIG. 4 in a K-means clustering analysis for selection of a selected set of MLMs. Thus, in the case of migration of MLM querying application 20, the selecting at block 1205 can be performed differently to result in selection of the different set of MLMs for receipt of query data sent at block 1206 and 1207. In the case of a service application migration, performance of an examining at block 1204 can result in improved latency ratings being applied for candidate MLMs located at the destination location of service application, and selection of a new one or more MLM having the improved latency ratings. There is set forth herein, according to one embodiment, a method, wherein the method includes, for a deployment period of the service application, iteratively performing the obtaining, the generating, the examining and the selecting concurrently with a migration of the service application from a first computing environment to a second computing environment, wherein the method includes iteratively changing the selected at least one model in dependence on the iteratively performing of the examining and the selecting, and wherein the migration of the service application from a first computing environment to a second computing environment results in selecting of a candidate machine learning model at the second computing environment as the selected machine learning model.

In another aspect, it will be recognized that different UE devices of UE devices 120A-120Z can be associated to different users who can define different text data, and different biometric data as sensed by a biometric sensor and can also generate service request data having different geostamps. Such different user-defined data associated to different UE devices 120A-120Z can change the factor values assigned using Eq.1 and Eq. 2 to result in different MLMs being selected for different instances of service request data sent at block 1201.

In another aspect, the updating of latency performance metrics data stored in data repository R associated to manager M running on a computing environment hosting MLM querying application 20 to include live performance metrics data resulting from a live querying of a certain MLM model can alter the coordinate plot associated to different MLMs as shown in FIG. 4 to also result in a different set of MLMs being selected at selecting block 1204 at a next iteration of the loop of blocks 1203-1205. Thus, live latency performance metrics data can drive the selection of a different set of MLMs or can result in the same set of MLMs being selected but in a different Euclidian distance proximity order to target performance coordinates 4002 as depicted in FIG. 4, thus changing the selected models and/or the weighting in a set of models that are queried using a weighted ensemble model technique. In the described example of the selecting at block 1205, the set of selected models can comprise first and second models. In another embodiment, more than two selected models can be selected, e.g., three models or N models.

In further aspects of manager node M, an instance of which can be incorporated into each respective computing environment of computing environments A-Z, is described in reference to FIG. 1B. In data repository R, manager node M can include infrastructure data area 2120L for storing locally collected infrastructure performance metrics data of computing nodes in VMs within a local computing environment to which manager node M is associated. Local MLM registry area 2122L can include local MLM performance metrics data acquired locally from a local computing environment to which manager node M is associated. Data repository R in infrastructure data area 2121G can store global infrastructure performance metrics data from all computing environments of system 100, which global infrastructure performance metrics data has been iteratively pushed by orchestrator 110 running pushing process 112. Data repository R in MLM registry area 2122 can include global MLM performance metrics data including MLM latency performance metrics data and MLM accuracy performance metrics data for all MLMs running in system 100, which MLM performance metrics data has been iteratively pushed by orchestrator 110 running pushing process 112. Manager node M can run various processes as set forth herein.

Manager node M running MLM latency test process 211 can iteratively test a latency of all local models local to a computing environment to which manager node M is associated. Manager node M running MLM latency test process 211 can iteratively send timestamped test queries to all MLMs within the local computing environment to which manager node M is associated and can iteratively monitor timestamped return data to ascertain and log in response time associated to each test query.

Manager node M running MLM accuracy test process 212 can iteratively perform accuracy tests for all local MLMs running in a local computing environment to which manager node M is associated. Such tests can include use of holdback data. Manager node M, according to one embodiment, can be configured to iteratively test each MLM that is being subject to training over time to iteratively ascertain whether that MLM is producing predictions according to a threshold satisfying level of accuracy and to return a scoring value indicating an accuracy performance score for the MLM. By MLM accuracy test process 212, manager node M can test one or more MLM that is configured for return of a prediction. Manager node M running MLM accuracy text process 212 can compare (a) predicted input variable values output by one or more MLM predictive model in response to a test query to (b) ground truth data defined by holdout data of logging data that is used for training and testing the MLM. Manager node M running MLM accuracy text process 212 for each MLM iteratively tested can return an iteratively updated MLM metrics score that specifies the accuracy performance of the MLM.

As set forth in reference to FIG. 1A, MLM querying application 20 can run a process by which query data is monitored for and can select one or more models for use in responding to the service to the incoming MLM query as explained with reference to selecting block 1205 of the flowchart of FIG. 3. In one embodiment, modular programming techniques can be employed and the performance of selecting block 1205, including use of Eq. 1 and Eq. 2 for return of predictions, can be allocated to manager node M in a computing environment common to the host computing environment of querying application 20. Manager node M running query directing process 213 can include manager node M running a daemon that waits for query data, which on detection by MLM querying application 20 can be routed externally from MLM querying application 20.

Query directing process 213 running the described daemon can, on the detection of query data from any instance of an MLM querying application 20 running within a current computing environment, perform selecting block 1205 to select a set of one or more MLMs for handling current incoming query data. Query directing process 213 can define a job router for routing incoming MLM query data to an appropriate one or more MLM that is selecting by selecting block 1205. Manager node M by query directing process 213 can be configured to run the described daemon in order to respond with appropriate MLM selection to any MLM query data invoked from any instance of MLM querying application 20 running within the computing environment to which manager node M is associated.

In another example of an integration scheme, all of the described functions of the manager node M, including MLM latency test process 211, MLM accuracy test process, and query directing process can be incorporated into and co-located with respective MLMs 30A-30Z, so that each MLM of system 100 is configured as a manager node 10. In such embodiment, each respective MLM, now configured as a manager node M, can iteratively perform self-tests for return of performance metrics data, can send iteratively updated metrics data to orchestrator 110, and can receive updated global metrics data from orchestrator 110 to iteratively update global infrastructure data area 2121G and global MLM registry 2122G of data repository R, now co-located with each respective MLM of system 100 configured as a manager node M.

Figure 1C:
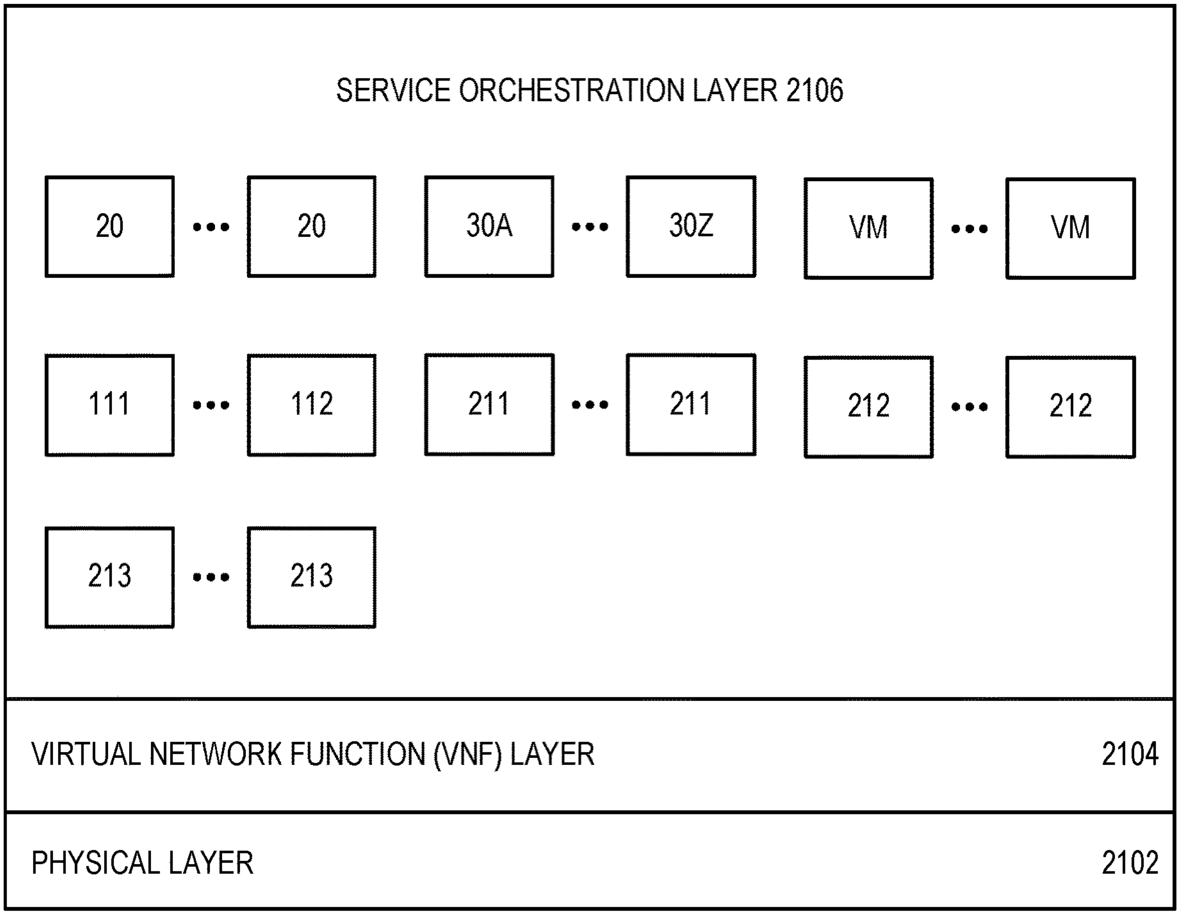
FIG. 1C is an open systems integration (OSI) model diagram depicting a system according to one embodiment.

FIG. 1C is an open systems interconnection (OSI) model of system 100. System 100 can include a physical layer, virtual network function (VNF) layer 2104, and service orchestration layer 2106. Physical layer 2102 can be responsible for performance of physical radio functions as well as physical functions of alternative interfaces, e.g., such functions as modulating and demodulating received radio signals and selecting appropriate communication bands or channels, and other electronic circuit transmissions.

Virtual network function (VNF) layer 2104 can be responsible for such functions as updating and distributing packet routing table data that specifies computing nodes 10A-10Z, 10 for performance of routed hop-by-hop data communication by system 100.

Service orchestration layer 2106 can include a plurality of software components as has been set forth herein, including instances of MLM querying application 20, MLMs 30A-30Z, VMs which host MLM querying applications MLMs 30A-30Z, as well as other software components set forth herein, such as polling process 111 run by orchestrator 110, pushing process 112 run by orchestrator 110, instances of MLM latency test process 211 run by instances of manager node M, instances of MLM accuracy test process 212 run by instances of manager node M, and instances of query directing process 213 defining a job router run by instances of manager node M of system 100.

Various available tools, libraries, and/or services can be utilized for implementation of predictive machine learning models (MLMs) herein. For example, a machine learning service can provide access to libraries and executable code for support of machine learning functions. A machine learning service can provide access to a set of REST APIs that can be called from any programming language and that permit the integration of predictive analytics into any application. Enabled REST APIs can provide, e.g., retrieval of metadata for a given predictive model, deployment of models and management of deployed models, online deployment, scoring, batch deployment, stream deployment, monitoring and retraining deployed models. According to one possible implementation, a machine learning service provided by IBMR WATSON® can provide access to libraries of APACHE® SPARK® and IBM SPSS® (IBM® WATSON® and SPSS® are registered trademarks of International Business Machines Corporation and APACHE® and SPARK R are registered trademarks of the Apache Software Foundation.). A machine learning service provided by IBM® WATSON® can provide access to a set of REST APIs that can be called from any programming language and that permit the integration of predictive analytics into any application. Enabled REST APIs can provide, e.g., retrieval of metadata for a given predictive model, deployment of models and management of deployed models, online deployment, scoring, batch deployment, stream deployment, monitoring and retraining deployed models. MLMs herein can employ a variety of different machine learning technologies, e.g., neural network (NN), support vector machine (SVM), linear regression, Holt-Winter, ARIMA, random forest, and others.

Embodiments herein can provide machine learning model and the AI job submitter functions in a 5G service orchestration layer and a programmability framework and provides a primary-agent discovery model for MLM characteristics discovery in the service orchestration plane. Embodiments herein can further initiate the inquiry for real time performance and response time estimation to complete the job and accordingly creates MLM groups in the job router functions.

Embodiments herein can compute for the MLM metrics data for hosting infrastructure components, performance characteristics along with MLM specific information like training corpus, and feature-set distribution for classification or regression. The information can be collected to generate estimation for response time. The response time can then be propagated to a job router function and saved as per defined MLM grouping policy in the job router functions. According to embodiments herein, when any AI computing job is submitted by external cognitive entities in the 5G cognitive orchestration plane, a system can inquire for response time expectations and accordingly can selects the MLM based on the exploration and workload management.

Performance authorization of MLMs for their price/performance and accordingly the jobs can be routed to deliver a pleasant experience for subscribed users.

In the case of urgent computational targets, the job router function can invoke the best possible MLM with minimal response time and gain the entity trust.

Embodiments herein recognize that the concept of 5G self optimized network (SON) can be addressed in a twofold manner within the SON-based autonomic management engine. The aim of a network optimization technique can be to specify the human-based tactical approaches regarding the reactions of the system in view or detection of certain events and anomalies in the system being controlled.

To achieve the better network infrastructure in more dynamic fashion, the algorithmic processing of the indicated strategies along the gradually built (machine learning based) artificial intelligence can be expected to produce optimal decisions. Embodiments herein recognize that in the context of this autonomic management framework, tactical autonomic language (TAL) constitutes the static definition of the intelligence, usually incorporating the experience of network management personnel that at least provides the initial starting point at which common sense intended behavior is expressed and that may thereafter be optimized by the artificial intelligence-based processing.

Embodiments herein can include 5G infrastructure and can include targets of several machine learning models that can be deployed as part of a service orchestration layer (and even some of them can be resident in a VNF layer).

Embodiments herein recognize that these machine learning models can be situated and hosted on different computing environments and can comprise altogether different operational characters. They can often be hosted on edge cloud and/or core cloud locations over a VM infrastructure and can be operational to compute outcomes for submitted jobs.

Embodiments herein recognize that a major component of a cognitive domain level orchestration entity can be machine learning models. These models typically comprise input feature sets and a mathematical model that is used as a basis for genesis while computing the outcomes.

Embodiments herein recognize that the outcomes can vary based on the type of machine leaning model, its algorithm, input training corpus, and other interrelated fields.

Outcomes can be classification or regression dependent on the need of the environment. In the cognitive systems, there could be many machine learning models with different functions and operation feature sets to produce an outcome. Accordingly, a stronger cognitive ecosystem can be provided with a variety of MLMs.

Embodiments herein recognize that many MLMs in a service orchestration plane can offer similar outcomes in response to input data with different model functions and associated feature sets including price and performance characteristics. Embodiments herein recognize that these MLMs can be invoked once a controlling entity receives a job request to get the AI enabled outcome for the submitted problem statements.

Embodiments herein recognize that there is no way today by which the urgency of the computation can be determined dynamically in the service plane and performance-based delegations can be provided to provide situation-oriented faster decisions.

Embodiments herein recognize that there is no way by which the machine learning models in the cognitive service orchestration plane can discover each other and collect the information from peers about their performance characteristics along with the hosting infrastructure, training corpus information, feature-sets, and related artifacts of the machine learning model and which can be used for performance-oriented delegation of the jobs. Embodiments herein recognize that there is no way today by which these machine learning models can collect the information about each other for their performance characteristics and accordingly, the job assignment logic can invoke the MLM based on situational computation urgency or another criterion.

Figure 5:
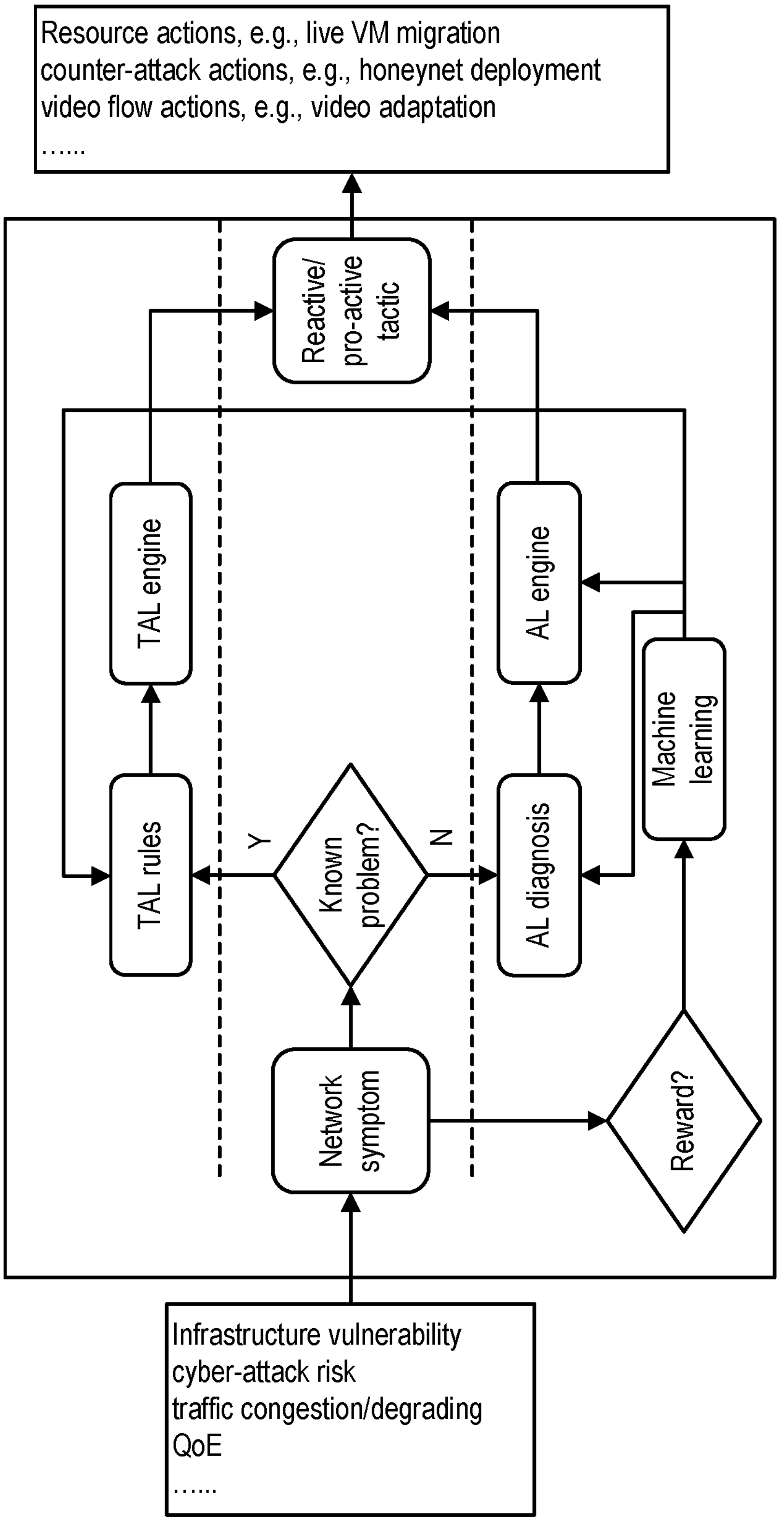
FIG. 5 is an action decision diagram depicting an action decision according to one embodiment.

As set forth in reference to blocks 1203-1211 of the flowchart of FIG. 3, methods herein can include iteratively obtaining service request data by a service application; iteratively generating query data for query of a machine learning model in dependence on the service request data; responsive to the generating of the query data, iteratively examining model data of a plurality of candidate machine learning models; iteratively selecting at least one model from the candidate machine learning models in dependence on the examining, wherein the at least one model defines a selected at least one model; and iteratively sending the query data for return of responsive prediction data to the at least one model. In some embodiments, iteratively performing examining model data and selecting of at least one MLM can be independent of a sensed condition. In one embodiment, iterative performance of examining and MLM model selection can be dependent on and triggered by a sensed condition, e.g., a sensed migration of an MLM or query generating application 20, as set forth herein. The triggering of model examining and selection can be incorporated into tactical autonomic language (TAL) functionality of a 5G service orchestration layer, an example of which is shown in FIG. 5.

Embodiments herein recognize that in a 5G network, there can be consequences where some of the jobs need to be performed with high speed and/or accuracy performance, while another set of jobs may have relatively greater latency tolerance and/or accuracy performance tolerance. Embodiments herein recognize that this can be typically classified based on the customer price definition and along with the nature of impact associated with AI based decisions making.

Embodiments herein can provide a method that can work with existing 5G service orchestration layer and the service management platforms and can provide the ability for performance and response-time oriented delegation of machine learning models in the plane. As there can be multiple MLMs that can be floating in various 5Glayers that can be hosted on different physical servers and locations, embodiments herein can provide a mechanism to discover the MLMs by a job submission router in the 5G plane and enquire for all the performance-based functionality of the machine learning models. When any MLM is activated on a server and the infrastructure is allocated to virtual machines in the 5G core (or edge network) cloud, then embodiments herein running in the MLM can collect the information and share it with the router functions. Embodiments herein can feature a primary-agent MLM discovery approach initiated by a job submission router in the 5G plane which comprises a daemon that can keep real-time mapping of the MLMs in the plane. Embodiments of MLMs herein configured as manager nodes M can run a job router function of 5G network, can load the data structures for all the MLMs of system 110, and can start discovery requests to all the reachable MLMs.

Embodiments herein recognize there can be many MLMs in the service orchestration plane and a job router function can be configured to have authorization to some or all of the MLMs. The daemon in the router function can invoke the in-band authorization services and can collect the UUIDs of the MLMs in the plane. A discovery module can be initiated that sends the performance-oriented discovery message to all the models. Intercommunication mechanics can be operated using 5Gs in band Media Access Control approach (in-band communication queue in 5G control plane (CP)). When any performance inquiry is received by the MLM instance, the MLM configured as a manager node M herein can start collecting the hosting infrastructure information, can compute the MLM's operation cost, and can locate the time and performance requirement to complete the job. The performance characterization is typically dependent on number of features and permutations to be used to generate the outcome by an MLM.

Based on these parameters, the expected response time orientation can be manifested, and the communication message can be triggered to send the inquiry response to the job router functions. Upon reception of an inquiry reply by the MLMs in a service orchestration plane, the service job submitter router can keep the information in the performance map local database which can be used at the time of situational urgency. The service job submission router can store in an associated data repository a list of all the machine learning models with their input feature-set, type (classification or regression) and other parameters like training corpus and metadata functions with accuracy. These parameters can be known to the job router function and an additional dynamic response-based measurement can be also saved within metadata mapper classes.

Figure 6:
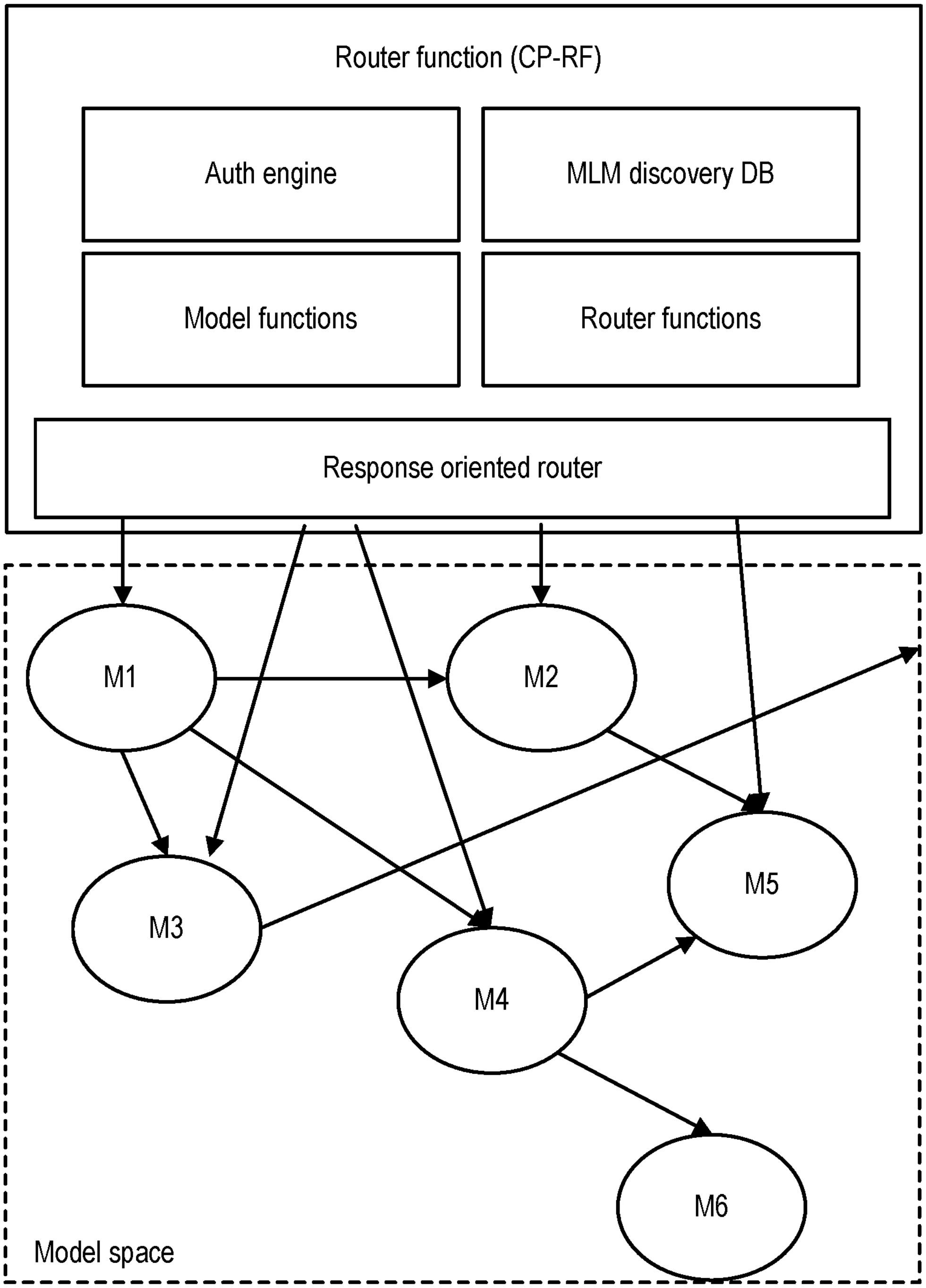
FIG. 6 depicts a job router according to one embodiment.
Figure 7:
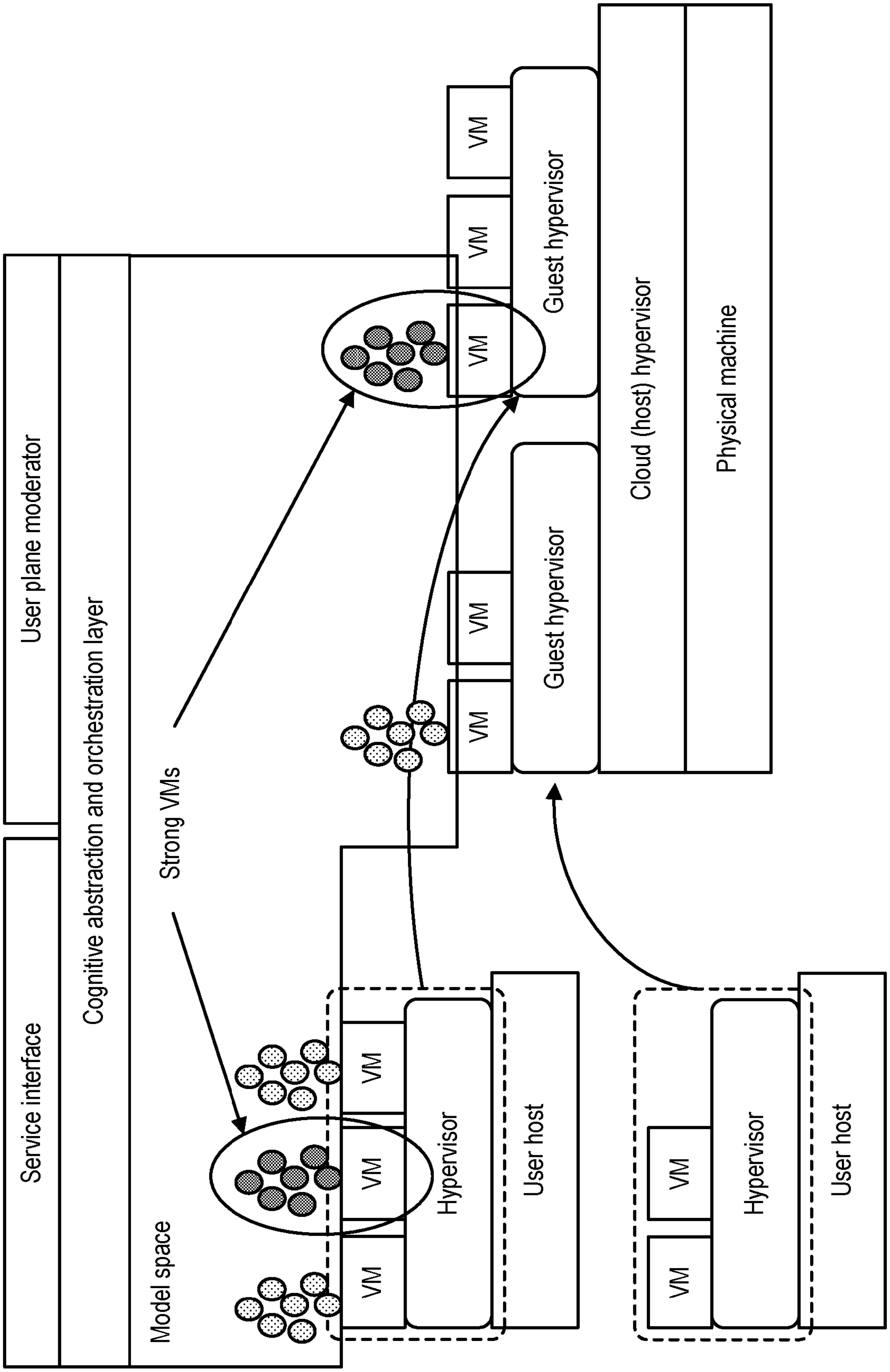
FIG. 7 is a diagram depicting machine learning model selection according to one embodiment.
Figure 8A:
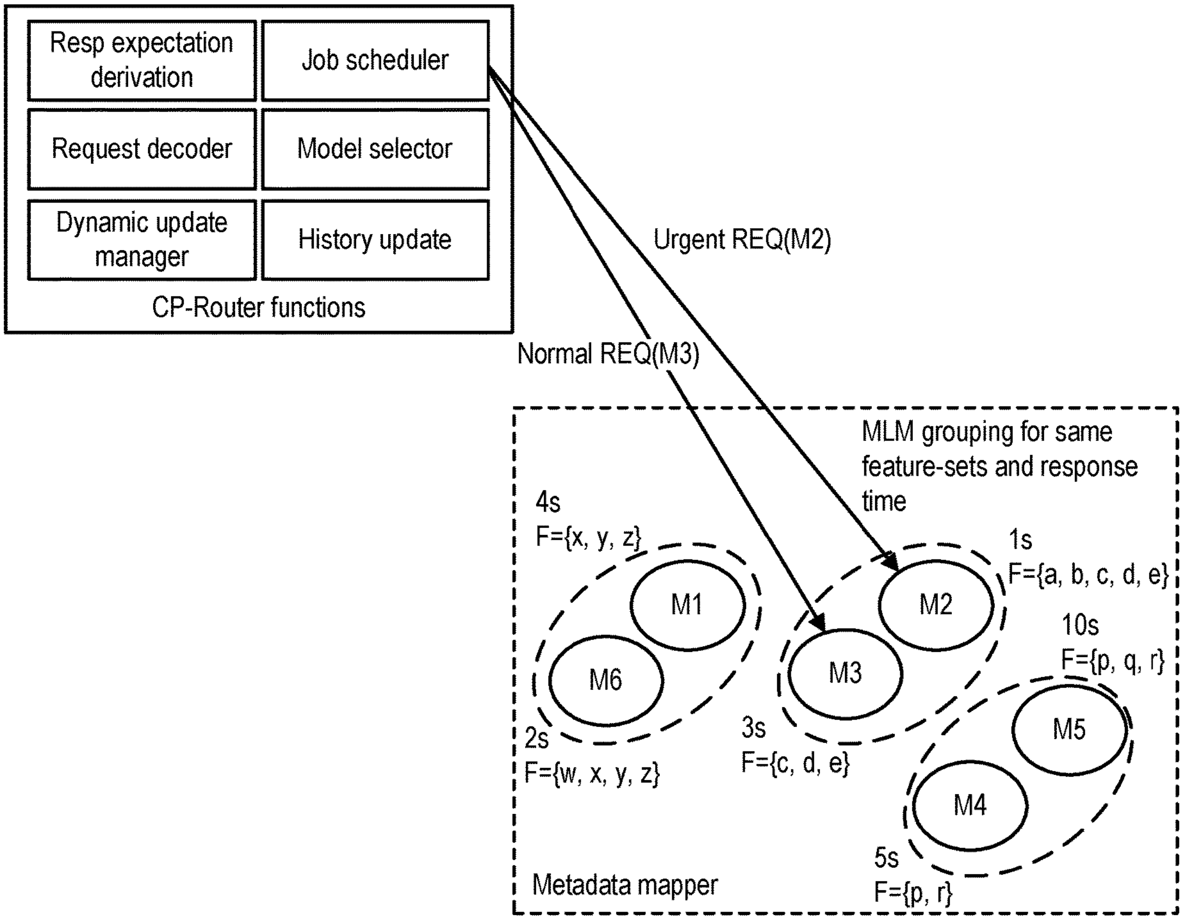
FIG. 8A is a diagram depicting machine learning model selection according to one embodiment and FIG. 8B depicts a job router according to one embodiment.
Figure 8B:
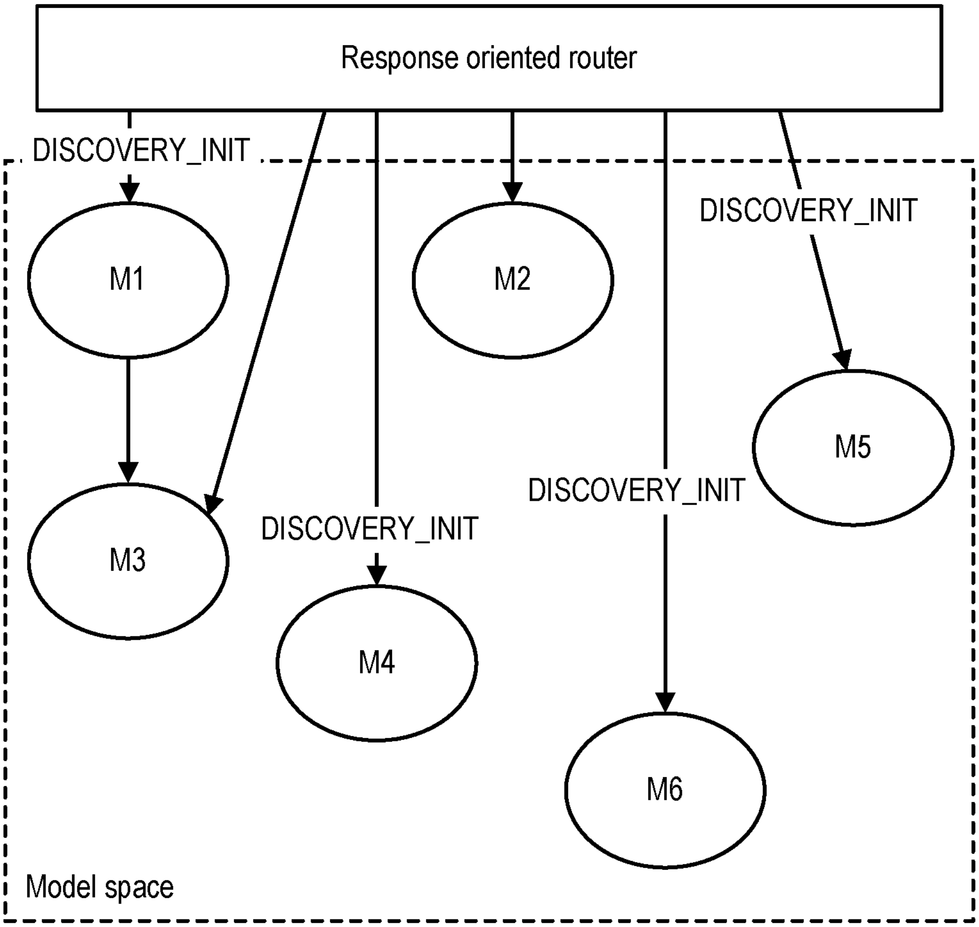

When any urgent MLM computation request requires a quick outcome, then the service job submitter router can extract and decode the performance requirement of the function, authenticate the service requests for to override the submission logic, and if the submitted job meets the targets, then the low response time model can be actuated for computation. When the decision of MLM selection is triggered, the database can be filtered for the MLMs having equal (or more) performance characters than the submitted job. Once the list of all the high performing MLMs is received, then the relatively free MLM can be selected to address the submitted job. Referring to FIG. 6 and FIG. 8B, a response-oriented job router function can be employed for selection of at least one MLM for handling of query data. As set forth herein, job router functions can be performed by a manager node M external to an MLM, or in some embodiments co-located with an MLM. Referring to FIG. 7, a manager node M can select at least one MLM for handling query data wherein the MLMs can be hosted on differentiated infrastructure. As set forth in reference to FIGS. 1A and 2A-2D, the different infrastructure can be infrastructure of different computing environments at different infrastructure locations. As depicted in FIG. 8A, a manager node M, by its job router function, can select a first MLM when an urgent request is detected and can select a second MLM when a non-urgent request is detected.

Embodiments in an MLM can continuously poll for the hosting infrastructure migration or similar signals from lower layers. These lower layers can be Network Functions and the OS signals which can be generated at the time of operational parameters change. When any of the operational parameter change identified by the MLM instance (like MLM migration or service application migrations from one server to another in a common or different computing environments of computing environments A-Z, or changes performance throttling of the device, etc.), then performance impact can be analyzed by the MLM instance using static or dynamic approaches. A static approach can include comparing the threshold-based polices in the MLM and accordingly selecting the performance expatiations, or it could be dynamic computation of hardware resources or VM parameters and articulation of the performance impact. In case the performance impact is detected, then the new performance orientation for the MLM can be computed and the signal can be generated for the submission router functions.

Submission router functions can receive the interrupted performance change signal and metadata mappers can be updated accordingly. As the dynamic updates can be performed at the job submission router functions in the 5G plane, real time response expectation of an MLM can be traced easily and the jobs can be allocated accordingly to the respective MLM.

Embodiments herein can provide performance improved faster decision making. Selection of an MLM can be achieved using performance-based delegation at MLM job router functions. When the upper layer wants faster outcomes, then these functionalities can be used to deliver machine learning decisions in defined time boundaries and help serving time critical use cases in a 5G network plane. The metadata mappers and the daemons can be included in a 5G control plane (CP); hence they can be transparent to user applications and can improve telecommunications infrastructure.

Figure 9:
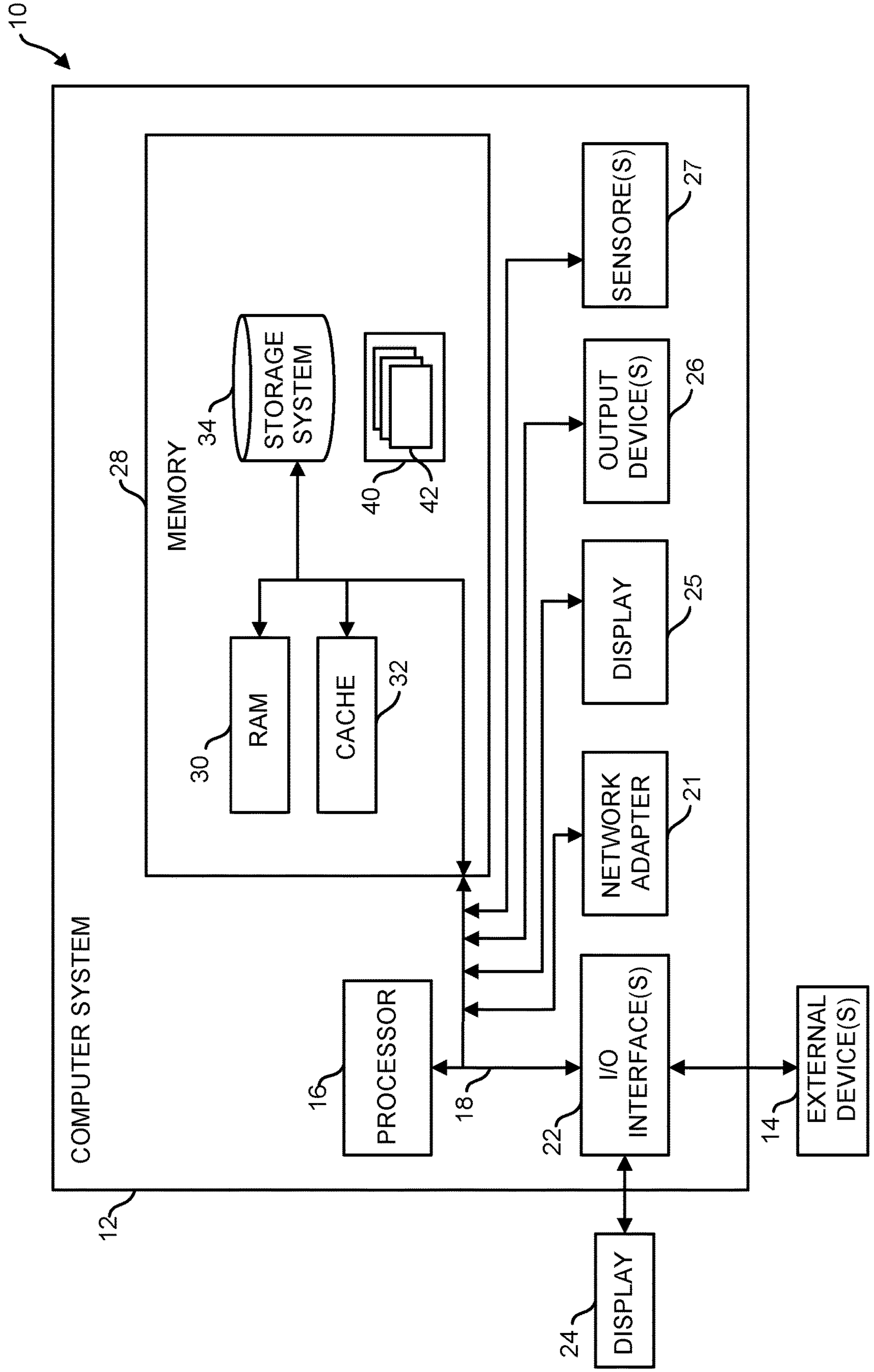
FIG. 9 depicts a computing node according to one embodiment.
Figure 10:
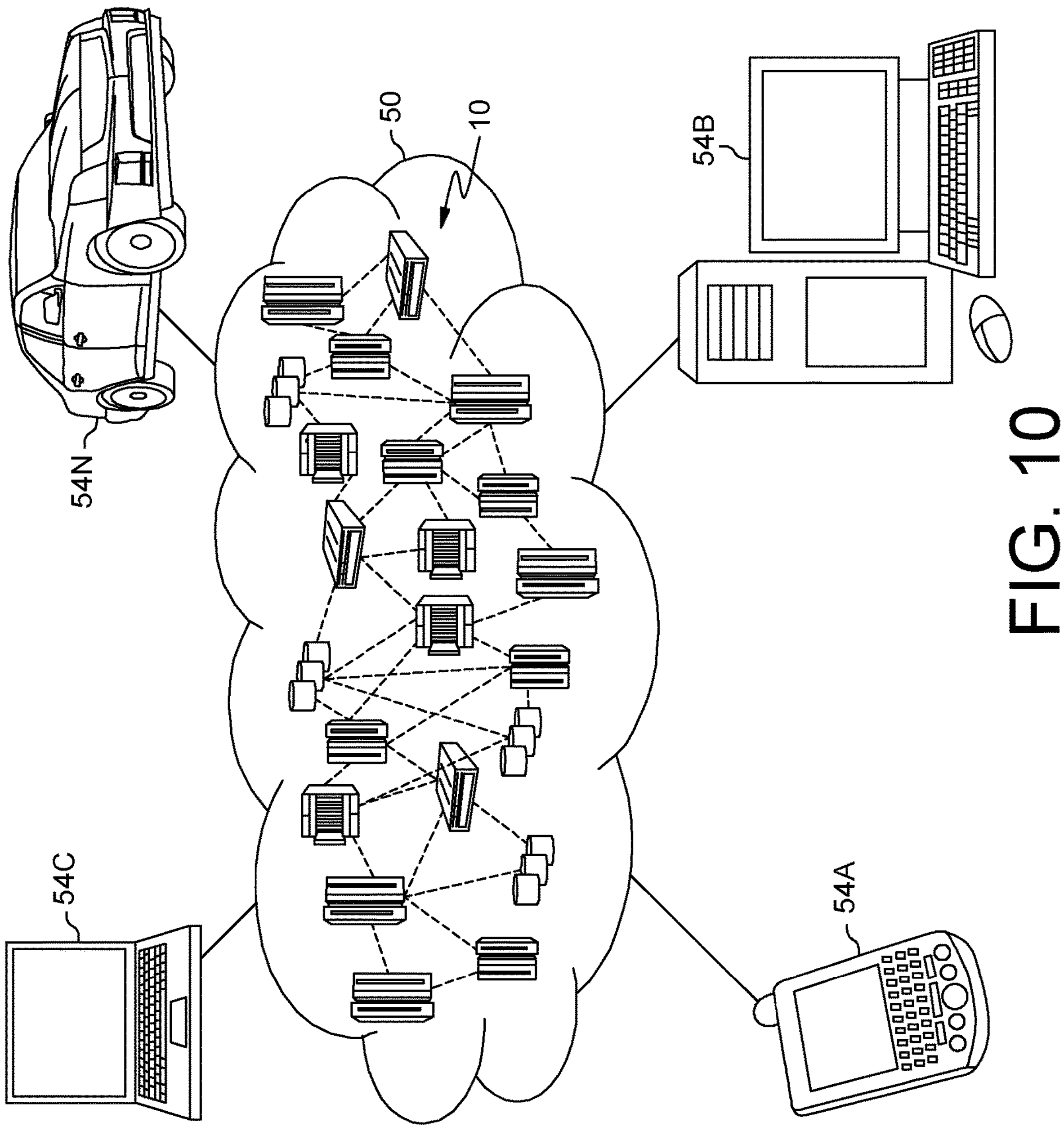
FIG. 10 depicts a cloud computing environment according to one embodiment.
Figure 11:
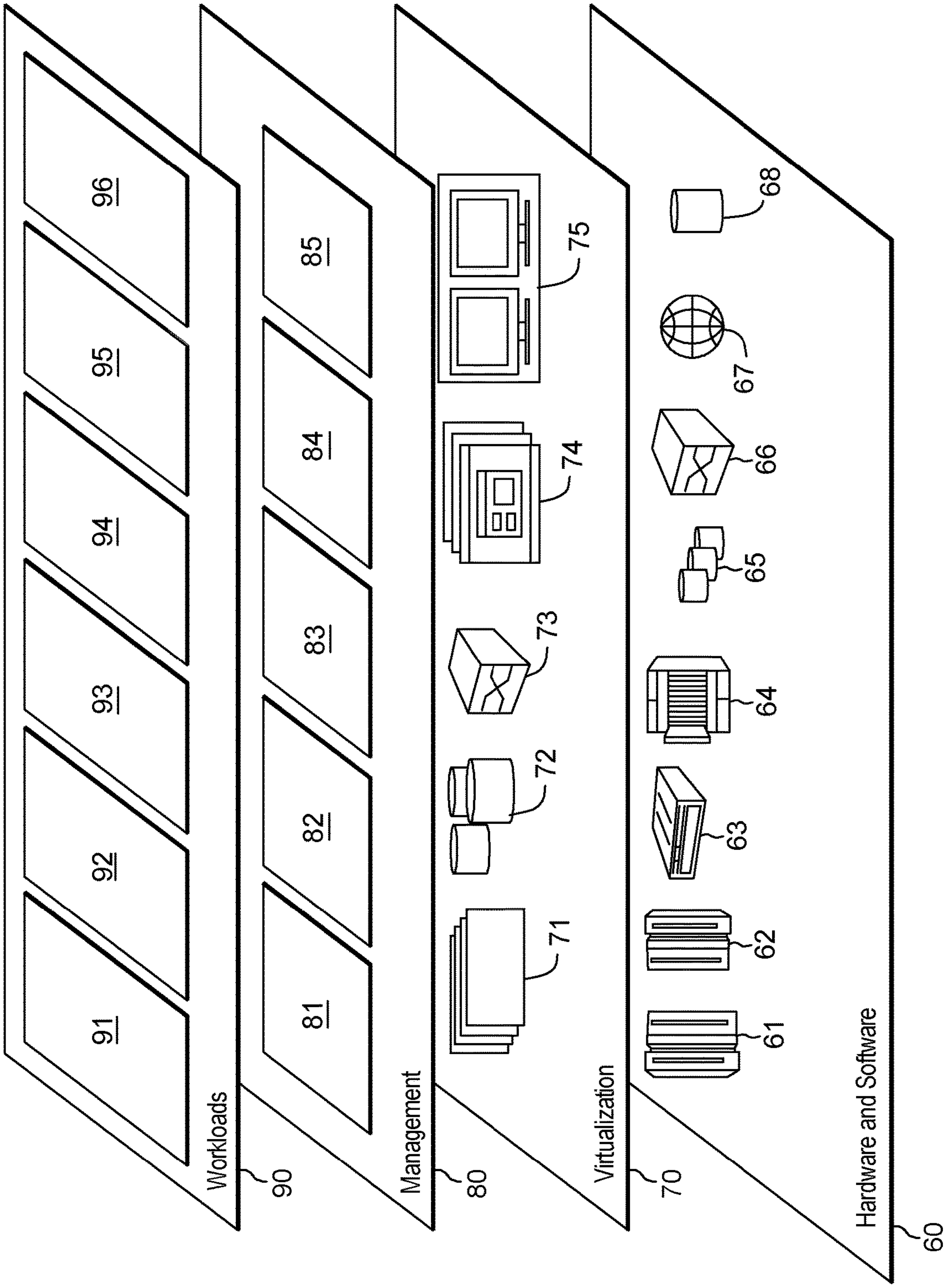
FIG. 11 depicts abstraction model layers according to one embodiment.

Certain embodiments herein may offer various technical computing advantages involving computing advantages to address problems arising in the realm of computer system. Embodiments herein can provide for selection of a machine learning model for query by a machine learning model querying application. An orchestrator can be configured for collection and distribution of performance metrics of machine learning models. A manager node can select a machine learning model based on latency performance characteristics and/or accuracy performance characteristic. A manager node can perform machine learning model latency and accuracy testing and can distribute metrics data so that machine learning model metrics data is globally shared in a system. Embodiments herein can analyze user defined service request data for determination of target attributes of a machine learning model for handling of query data. Embodiments herein can select at least one machine learning model in dependence on determined target attributes and on examined model data of a plurality of candidate machine learning models distributed throughout different computing environments of different infrastructure locations in a system having multiple computing environments which can include an edge network. Data from a UE device in communication with a service application can be examined for determination of current latency and accuracy targets. Certain embodiments may be implemented by use of a cloud platform/data center in various types including a Software-as-a-Service (SaaS), Platform-as-a-Service (PaaS), Database-as-a-Service (DBaaS), and combinations thereof based on types of subscription FIGS. 9-11 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (Saas): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security targets, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 9, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 9, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 10-11.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, orchestrator 110 can include one or more computing node 10 and can include one or more program 40 for performing functions described with reference to orchestrator 110 as set forth herein. In one embodiment, one or more UE device 120A-120Z can include one or more computing node 10 and can include one or more program 40 for performing functions described with reference to one or more UE device 120A-120Z as set forth herein. In one embodiment, the computing node based systems and devices as set forth herein, including computing nodes 10A-10Z, 10 as set forth herein, can include one or more program for performing function described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g., can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 10 computing node 10 is described as being implemented in a cloud computing environment and accordingly is referred to as a cloud computing node in the context of FIG. 10.

Referring now to FIG. 10, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for selecting machine learning as set forth herein. The processing components 96 can be implemented with use of one or more program 40 described in FIG. 9.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:

obtaining service request data by a service application;

generating query data for query of a machine learning model in dependence on the service request data;

responsive to the generating of the query data, examining model data of a plurality of candidate machine learning models;

selecting at least one model from the candidate machine learning models in dependence on the examining, wherein the at least one model defines a selected at least one model; and sending the query data for return of responsive prediction data to the at least one model.

2. The computer implemented method of claim 1, wherein the examining model data of a plurality of candidate machine learning models includes examining performance metrics data of a first machine learning model hosted in a first computing environment provided by a core network, and examining performance metrics data of a second machine learning model hosted in a second computing environment provided by an edge network.

3. The computer implemented method of claim 1, wherein the method includes determining targets for the selected at least one model by examining data of the service request data.

4. The computer implemented method of claim 1, wherein the obtaining, the generating, the examining and the selecting are performed by a service orchestration layer, and wherein the method includes sending, by the service orchestration layer, test query data for return of performance metrics data of the candidate machine learning models, wherein the examining model data of a plurality of candidate machine learning models includes examining the performance metrics data.

5. The computer implemented method of claim 1, wherein the method includes, for a deployment period of the service application, iteratively performing the obtaining, the generating, the examining and the selecting responsive to iterative instances of the service request data, and wherein the method includes iteratively changing the selected at least one model in dependence on the iteratively performing of the examining and the selecting.

6. The computer implemented method of claim 1, wherein the method includes, for a deployment period of the service application, iteratively performing the obtaining, the generating, the examining and the selecting concurrently with a migration of the service application from a first computing environment to a second computing environment, wherein the method includes iteratively changing the selected at least one model in dependence on the iteratively performing of the examining and the selecting, and wherein the migration of the service application from a first computing environment to a second computing environment results in selecting of a candidate machine learning model at the second computing environment as the selected at least one machine learning model.

7. The computer implemented method of claim 1, wherein the method includes, for a deployment period of the service application, iteratively performing the obtaining, the generating, the examining and the selecting responsive to iterative instances of the service request data, and wherein the method includes iteratively changing the selected at least one model in dependence on the iteratively performing of the examining and the selecting, wherein the iteratively performing of the examining and the selecting is performed so that in a second time period subsequent to a first time period a selected model of the selected at least one model includes a model hosted in a computing environment infrastructure location that does not host any model of the selected at least one model of the first time period.

8. The computer implemented method of claim 1, wherein the service request data includes user defined service request data, wherein the method includes analyzing the user defined service request data to determine requirement data of the at least one selected model, and wherein the selecting is performed in dependence on the requirement data as determined by the analyzing the user defined service request data.

9. The computer implemented method of claim 1, wherein the service request data includes user defined service request data, wherein the method includes analyzing the user defined service request data to determine requirement data of the at least one selected model, and wherein the selecting is performed in dependence on the requirement data as determined by the analyzing the user defined service request data, wherein the user defined service request data includes voice data, text data, geostamp data and biometric data provided by a biometric sensor.

10. The computer implemented method of claim 1, wherein the service request data includes user defined service request data, wherein the method includes analyzing the user defined service request data to determine requirement data of the at least one selected model, and wherein the selecting is performed in dependence on the requirement data as determined by the analyzing the user defined service request data, wherein the user defined service request data includes voice data, text data, geostamp data and biometric data provide by a biometric sensor, wherein the requirement data includes latency performance metric data and accuracy performance metric data.

11. The computer implemented method of claim 1, wherein the service application is hosted on a first computing node, wherein the method includes iteratively performing the obtaining, the generating, the examining and the selecting responsive to iterative instances of the service request data, and wherein the method includes iteratively changing the selected at least one model in dependence on the iteratively performing of the examining and the selecting, and wherein an instance of the iteratively performing of the examining and the selecting is performed in response to detection of a migration of the service application from the first computing node to a second computing node.

12. The computer implemented method of claim 1, wherein a certain model of the at least one selected model is hosted on a first computing node, wherein the method includes iteratively performing the obtaining, the generating, the examining and the selecting responsive to iterative instances of the service request data, and wherein the method includes iteratively changing the selected at least one model in dependence on the iteratively performing of the examining and the selecting, and wherein an instance of the iteratively performing of the examining and the selecting is performed in response to detection of a migration of the certain model from the first computing node to a second computing node.

13. The computer implemented method of claim 1, further comprising: analyzing the service request data received by the service application to determine a latency performance target and an accuracy performance target, the analyzing comprising executing a multi-factor weighted scoring process including calculating a latency score based on at least one of a sentiment factor, a topic classification factor, a geospatial location factor, and a biometric sensor factor associated with the service request data, and calculating an accuracy score based on at least one of a sentiment factor, a topic classification factor, a geospatial location factor, and a biometric sensor factor, wherein each of the factors is assigned a respective weight, and the latency and accuracy performance targets are used as coordinates in a multidimensional performance space for evaluating candidate machine learning models during the selecting.

14. The computer implemented method of claim 1, wherein examining model data of the plurality of candidate machine learning models comprises: retrieving latency and accuracy performance metrics of the candidate machine learning models from a distributed global machine learning model registry, and adjusting the retrieved latency metrics using infrastructure performance data including geospatial coordinate location data of computing nodes and network topology data specifying physical distance and a number of hop counts between a computing node hosting the service application and computing nodes hosting respective candidate machine learning models, the adjusted latency metrics being used to penalize or boost latency scores during model evaluation for improved real-world latency performance prediction.

15. The computer implemented method of claim 1, wherein the selecting comprises: selecting a subset of N candidate machine learning models based on a performance clustering analysis that maps each candidate model into a multidimensional vector space defined by accuracy and latency metrics, wherein the selected models are those exhibiting minimal Euclidean distance to a target performance coordinate derived from analysis of the service request data, and further comprising deploying the selected N models in an ensemble configuration, wherein predictions are aggregated using model-specific weighting coefficients determined by relative distance to the target coordinate, such that an ensemble output prioritizes models exhibiting both low latency and high accuracy in response to dynamic service request profiles.

16. The computer implemented method of claim 1, further comprising: for a deployment period of the service application, iteratively performing the obtaining of service request data, generating of query data, examining of model data, selecting of candidate models, and sending of query data to selected models, wherein each iteration includes live monitoring of response time from queried models and updating of local and global performance metric repositories with latency and accuracy metrics derived from real-time prediction results, and wherein the updated repositories are distributed to manager nodes of respective computing environments for synchronization with infrastructure data and model registries, such that subsequent iterations of model selection incorporate live performance feedback and adapt to evolving system conditions and model behavior.

17. The computer implemented method of claim 1, wherein the service application is hosted on a virtual machine, and further comprising: dynamically migrating the virtual machine from a first computing environment to a second computing environment during runtime based on a sensed performance optimization condition, wherein the examining step includes adjusting latency biasing coefficients associated with candidate machine learning models to reflect the migration, including recomputing latency scores based on updated infrastructure distance and hop-count metrics, and wherein the selecting step includes reprioritizing models hosted in the second computing environment or computing environments topologically closer to the migrated service application, such that at least one selected model is hosted in the second computing environment, thereby reducing network-induced latency and enhancing prediction response time for subsequent queries generated by the service application.

18. A computer program product comprising:

a computer readable storage medium readable by one or more processing circuit and storing instructions for execution by one or more processor for performing a method comprising:

obtaining service request data by a service application; generating query data for query of a machine learning model in dependence on the service request data;

responsive to the generating of the query data, examining model data of a plurality of candidate machine learning models;

selecting at least one model from the candidate machine learning models in dependence on the examining, wherein the at least one model defines a selected at least one model; and sending the query data for return of responsive prediction data to the at least one model.

19. The computer program product of claim 18, wherein the method includes, for a deployment period of the service application, iteratively performing the obtaining of service request data, generating of query data, examining of model data of a plurality of candidate machine learning models, and selecting of at least one model in response to iterative instances of the service request data, wherein the service request data includes user-defined service request data, and wherein the method further comprises analyzing the user-defined service request data to determine requirement data of the selected at least one model, including latency and accuracy performance targets, and selecting the at least one model in dependence on the requirement data, wherein the examining of model data includes examining performance metrics data of a first machine learning model hosted in a first computing environment provided by a core network and performance metrics data of a second machine learning model hosted in a second computing environment provided by an edge network, wherein the examining is performed by a service orchestration layer, and includes examining performance metrics data returned in response to test query data sent by the service orchestration layer to the candidate machine learning models, and wherein the method further includes iteratively changing the selected at least one model in dependence on the iteratively performed examining and selecting, such that in a second time period subsequent to a first time period, a selected model of the selected at least one model includes a model hosted in a computing environment infrastructure location that does not host any model of the selected at least one model of the first time period.

20. A system comprising:

a memory;

at least one processor in communication with the memory; and program instructions executable by one or more processor via the memory to perform a method comprising:

obtaining service request data by a service application; generating query data for query of a machine learning model in dependence on the service request data;

responsive to the generating of the query data, examining model data of a plurality of candidate machine learning models;

selecting at least one model from the candidate machine learning models in dependence on the examining, wherein the at least one model defines a selected at least one model; and sending the query data for return of responsive prediction data to the at least one model.

* * * * *